United States Patent
Fang et al.

(10) Patent No.: US 11,802,937 B2
(45) Date of Patent: Oct. 31, 2023

(54) RECONFIGURABLE RADIO FREQUENCY FRONT END FOR A RADAR SYSTEM

(71) Applicant: METAWAVE Corporation, Carlsbad, CA (US)

(72) Inventors: Jun Fang, San Jose, CA (US); Maha Achour, Encinitas, CA (US); Taha Shahvirdi Dizaj Yekan, San Diego, CA (US); Hratchia Tom Zarian, San Diego, CA (US); Sandra Lynn Godsey, Carlsbad, CA (US)

(73) Assignee: Metawave Corporation, Carlsbad, CA (US)

( * ) Notice: Subject to any disclaimer, the term of this patent is extended or adjusted under 35 U.S.C. 154(b) by 408 days.

(21) Appl. No.: 16/878,414

(22) Filed: May 19, 2020

(65) Prior Publication Data
US 2020/0393552 A1    Dec. 17, 2020

Related U.S. Application Data

(60) Provisional application No. 62/891,559, filed on Aug. 26, 2019, provisional application No. 62/860,960, filed on Jun. 13, 2019.

(51) Int. Cl.
| | |
|---|---|
| *G01S 7/00* | (2006.01) |
| *G01S 13/44* | (2006.01) |
| *G01S 13/02* | (2006.01) |
| *G01S 17/931* | (2020.01) |
| *G01S 7/02* | (2006.01) |
| *G01S 13/931* | (2020.01) |

(52) U.S. Cl.
CPC .............. *G01S 7/003* (2013.01); *G01S 7/023* (2013.01); *G01S 13/0209* (2013.01); *G01S 13/4463* (2013.01); *G01S 17/931* (2020.01); *G01S 2013/9316* (2020.01)

(58) Field of Classification Search
None
See application file for complete search history.

(56) References Cited

U.S. PATENT DOCUMENTS

2020/0371229 A1* 11/2020 Levitan .................. G01S 7/285

* cited by examiner

*Primary Examiner* — Whitney Moore

(57) ABSTRACT

Examples disclosed herein relate to reconfigurable circuits and systems for a radar system enabling both short-range and long-range operation. A reconfiguration module enables the various configuration changes for operation. The multi-range operation may be used to adjust transmission parameters of other modules including wireless communications.

20 Claims, 23 Drawing Sheets

|        | 802 | 804 | 806 | 808 | 810 | 812 | 814 | 816 |
|--------|-----|-----|-----|-----|-----|-----|-----|-----|
| SLOT   | 1   | 2   | 3   | 4   | 5   | 6   | 7   | 8   |
| LRR Tx | Tx (1) |   |   | Tx (2) |   |   | Tx (3) |   |
| TRANSITION |   | RTT (1) |   |   | RTT (2) |   |   | RTT (3) |
| LRR Rx |   |   | Rx (1) |   |   | Rx(2) |   |   |

FIG. 8

|        | 902 | 904 | 906 | 908 | 910 | 912 | 914 | 916 |
|--------|-----|-----|-----|-----|-----|-----|-----|-----|
| SLOT   | 1   | 2   | 3   | 4   | 5   | 6   | 7   | 8   |
| LRR Tx | Tx (1) |   |   | Tx (2) |   |   | Tx (3) |   |
| SRR    |   | SRR |   |   | SRR |   |   | SRR |
| LRR Rx |   |   | Rx (1) |   |   | Rx(2) |   |   |

FIG. 9

RECONFIGURABLE RADIO FREQUENCY FRONT END FOR A RADAR SYSTEM

CLAIM OF PRIORITY

The present application for patent claims priority to the following applications:

U.S. Provisional Application No. 62/860,960 entitled "RECONFIGURABLE RF FRONT END FOR A RADAR SYSTEM," filed on Jun. 13, 2019; and U.S. Provisional Application No. 62/891,559 entitled "RECONFIGURABLE RF FRONT END FOR A RADAR SYSTEM," filed on Aug. 26, 2019, both of which are hereby incorporated by reference.

FIELD OF THE INVENTION

The present invention relates to antenna systems, and specifically to controlling and configuring antenna arrays for radar operation.

BACKGROUND

Vehicle automation is based on reliable, accurate sensing operations. One of the sensors incorporated for short-range and long-range object detection is a radar unit. The radar unit offers advantages over many other types of sensors, as it is fully operational in a variety of weather conditions, lighting conditions and may be easily built, controlled and interpreted. As automation continues, the radar is tasked and challenged with expanded functional challenges.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIG. 8 illustrates a timing scenario for an antenna system to achieve long range operation, according to embodiments of the present inventions;

FIG. 9 illustrates a timing scenario for an antenna system to achieve short-range and long-range operation, according to embodiments of the present inventions;

DETAILED DESCRIPTION

Methods and apparatuses for reconfigurable radar units are disclosed. The present disclosure provides methods and apparatuses for an antenna array, such as for radar or wireless communications, having an array of radiating elements and a feed structure with multiple range operation. The feed structure distributes the transmission signal throughout the transmission array, wherein the transmission signal propagates along the rows of the transmission array. The system operates to accomplish long range and short range transmissions. This is done through a short-range transmission path, a long-range transmission path and a reconfiguration module coupled thereto and adapted to reconfigure the antenna system for operation. In some embodiments, the system includes a power divider and combiner network, a power divider and combiner network to operate to divide transmit signals and to combine received signals, a switch coupled to the power divider and combiner network to control operation, an array of radiating elements coupled to the power divider and combiner network adapted to operate for transmission and reception of radiation signals and a reconfiguration module controlling the switch and operation of the antenna system. A reconfiguration module controls the switch and operation of the antenna system and is adapted to configure the system to transmit signals from the receive antenna element array and to receive signals at the transmit antenna element array. Such systems enable short and long range transmissions that adapt as needed. In a radar system, the ability to focus short range at one time and long range at another time is beneficial. In some embodiments the arrangement of the components enables short and long range operation concurrently. A variety of configurations and reconfigurations are implemented to meet a variety of applications.

The present invention in some embodiments applies an optimization algorithm to prepare a set of input voltages for a variety of transmission angles, avoiding prior calibration and other methods that tested a large number of combinations to determine operation of an antenna. These are used to adjust the specific operation of the antenna array(s). For each reconfiguration a calibration system assigns different sets of voltage values as described herein for some embodiments.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
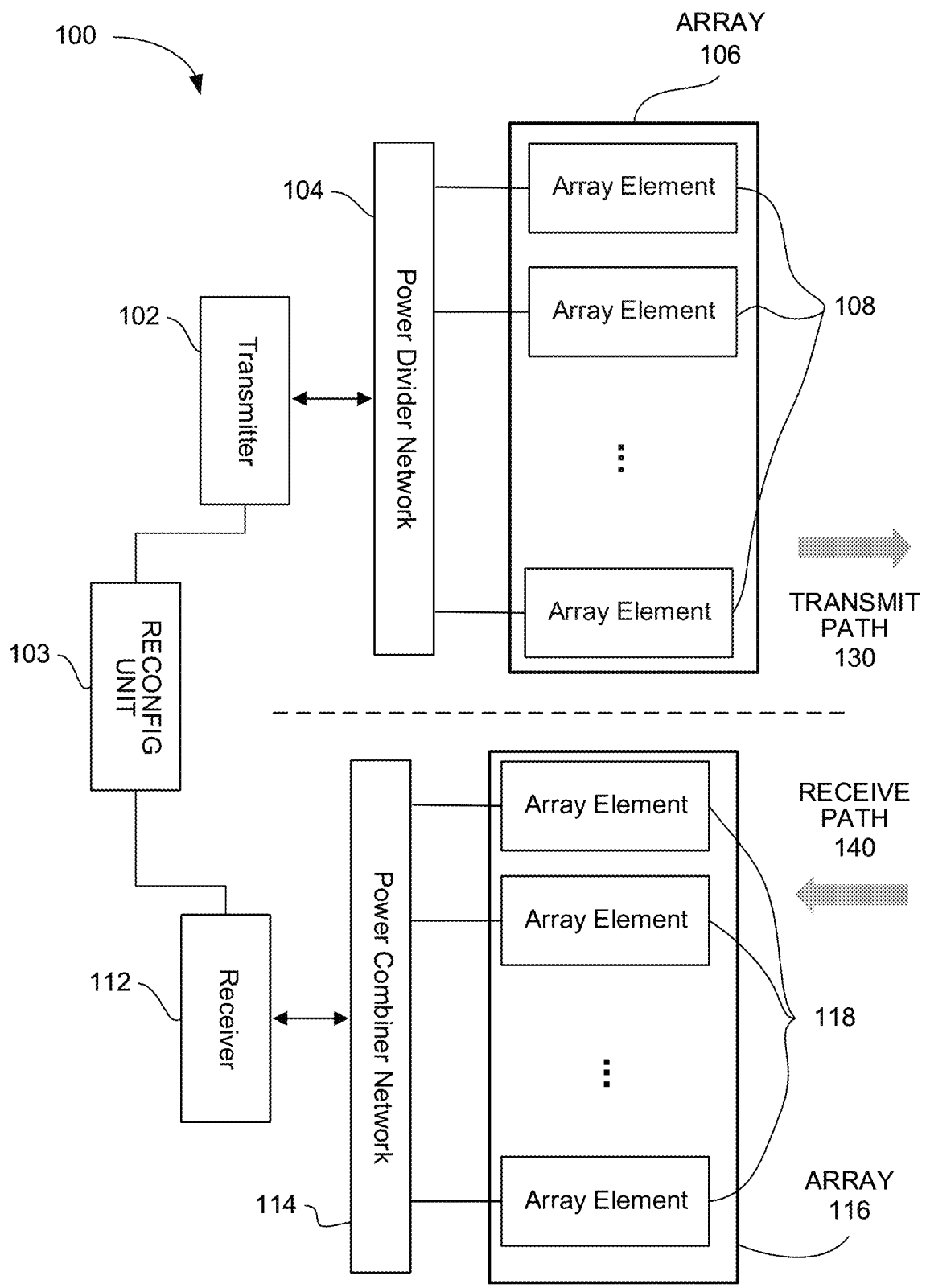
FIG. 1 illustrates an antenna system having separate transmit and receive paths for radar applications, according to embodiments of the present inventions.

FIG. 1 illustrates an antenna array system 100, having separate transmit and receive paths, 130, 140, respectively. The system 100 includes a transmit path 130 describing a path by which a transmitter 102, or transceiver, sends a transmission signal to a power divider network 104 for distribution to antenna array 106 having multiple radiating elements 108. The transmit signal is then divided according to a desired scheme; this may be to uniformly divide the power delivered to one or more elements 108, to implement a tapering method that may be physical or dynamically controlled, or a shaping method to form the transmission beam. In some examples, application of a Chebyshev-type method adjusts a desired signal level to each array element, radiating element 108. In these methods, the shape and/or configuration of beamforms from radiating elements 108 within an antenna array 106 are modified, such as along the edges or in the corners. There are various reasons for such modification as this is used to shape the composite radiation beam and thereby focus energy in a given direction or spread power out over a specific region. In some embodiments, amplitude tapering is applied by the power divider network 104 configuration to reduce side lobes in a transmitted radiation signal. In other embodiments, the shape and configuration of the array elements 108 are designed to achieve effects, such as amplitude tapering on the sides of the array 106. In other embodiments, both the power divider network 104 and the array element configuration in array 106 work together to achieve desired results. These effects may be implemented dynamically, in some embodiments, by digital control of the power distribution.

The application, scenario, and environment play a role in determining the specific modifications applied. For example, in a radar system the main radiated beam is a directed beam with high gain, but there may also be side lobes with significant gain. The energy of the side lobes introduces undesirable energy near the desired directed energy; the side lobes interfere with sensor accuracy, introducing multipath, clutter and so forth. In high directivity antennas, the sidelobes permit reception of energy from undesired directions. Some methods for reducing side lobes apply weights to elements at different locations within the array to distribute power across the antenna aperture or array of elements; these methods may expand the bandwidth or may introduce unintended effects. Some embodiments of the present inventions have antenna arrays arranged in different configurations or may implement various shapes for the antenna elements to reduce and taper the amplitude of side lobes. Control of side lobes is just one of many types of beam formation control that are designed to improve performance of the antenna and its operation, such as for radar. The present inventions consider and resolve the impact of unintended radiation, such as grating lobes.

The system 100 includes a receive path 140 wherein signal reflections from targets, detected objects, where array 116 receives reflections which are then provided to a receiver 112, or transceiver, for processing within the system 100 using other modules (not shown). In some embodiments a single transceiver may include both transmitter 102 and receiver 112 performing both transmit and receive operations. During processing, the receiver 112 receives signals from power combiner network 114 corresponding to reflections, echoes and over-the-air signals received at array elements 118 of receive array 116.

Many applications incorporating radar units, such as in automotive applications, multiple radar modules are placed on the vehicle to facilitate multiple sensor operation. In this way, a first radar module will operate to detect objects at long range from the vehicle and a second radar module will operate to detect objects at short range around the vehicle. Radar modules are used to detect pedestrians walking in front of a vehicle and assist the driver to avoid the pedestrian. Radar modules are also used to detect vehicles in traffic to operate cruise control. There are many applications of radar for this type of detection and each is typically specified by the range of detection, which is the distance from the vehicle to the object. Each sensor has a time component to avoid the object. For short range detection, the time is less than that of long range detection. The present inventions provide methods and apparatuses for a multi-use radar antenna system having a reconfiguration unit to adjust operation of the radar unit according to the specifics of the detection range desired. In FIG. 1, system 100 includes reconfiguration unit 103 to control and change operation of the system 100 depending on the desired detection range. For example, in the illustrated embodiment, long ranges are possible with a first control and short range with a second control. The control is applied to the network 104 and/or the array 106 such that the beam forms are controlled depending on the desired range and field of view. The reconfiguration unit 103 may operate on a continuous scale to adjust the detection range or may be discrete levels. This ability to change the performance of the antenna in real time provides a flexible, responsive radar operation.

Operation of system 100 may proceed in a time division manner to apply different modes of operation. In some examples discussed herein, these modes are applied at different time slots. FIG. 8 illustrates a timing diagram for such a scheme to provide short-range radar (SRR) and long-range radar (LRR) at separate times with the same antenna system 100. The system 100 is adapted to support both LRR and SRR operation. The system 100 is a smart radar adapted to transmit and receive SRR signals alternating with LRR signals, wherein the time slots may be changed in duration and order to enable custom operation in a given application. For SRR operation, the beam forms a wide beam with lower gain for fast processing and decision making to avoid accidents in the near area. For LRR operation, the beam forms a narrow beam with high gain as the beam is to cover a longer distance. For objects at long distance from the radar, or vehicle, the system has more time for decision making and action. The LRR operation has a longer processing time due to the longer distances, wherein this allows for highly reliable decisions. The range control of system 100, such as from reconfiguration unit 103, enables SRR and LRR according to a time division scheme. One scheme is time division duplexing (TDD) which alternates SRR active and LRR active configurations.

The time frames of FIG. 8 are a function of the maximum range ($Range_{MAX}$), which is determined by the system level parameters. The TDD timing is then constrained by the round-trip time (RTT) which is a function of the $Range_{MAX}$. Specifically, in some embodiments, to avoid conflicts in the time domain, the RTT constraints are given as:

$RTT = 2*Range_{MAX}/c$, wherein $c$ is the speed of light;

$$RTT > \max(t_{Transmit}, t_{Receive}),$$

wherein $t_{Transmit}$ is the transmit time slot and $t_{Receive}$ is the receive time slot.

The present invention describes and discloses a highly efficient system design providing both SRR and LRR functions in a smart radar system by taking advantage of time periods which are not used during operation of a single range capability. As illustrated in FIG. 8, time periods that the radar uses in LRR mode cannot be used in SRR mode. For example, the LRR mode includes RTT time allocations that are effectively not used and allocates these times to SRR mode operation enabling the radar system to provide both LRR and SRR modes of operation.

A range control module, such as reconfiguration unit 103, switches between range modes. The switching may occur within nanoseconds (ns). A very short guard time (GT) (not shown) may be inserted before and after RTTs of a given mode to accommodate such switching. As the modes are operational over different time slots, the two different modes (LRR and SRR) may reuse a majority of hardware and software resources to optimize time, such as to use common antenna array, feed network, divider, combiner, phase shifters, filters, DSP, amplifiers, and so forth. The time slot organization, and the time duration of each slot, may be designed for a specific operational condition, such as for SRR and LRR operating together. In some embodiments the time slot organization and time duration of each slot is adjusted in real time in response to conditions of the environment, such as to use more SRR slots at slower speeds, or to use more LRR slots for highway driving. This control is done in software to change the controls on various elements in the system 100.

In various embodiments, the transmit path 130 and the receive path 140 may be active concurrently or at different time periods, while the range control to enable SRR and LRR may use a time division scheme. Using the reconfigurable system 100, where the array 106 is a phased array coupled to feed network hardware, of the power divider network 104, the reconfiguration unit 103 may control active elements in network 104 and/or array 106, as well as control transmission paths in network 104. Similar control is performed for the receive path 140 as well. In various examples, the radar system may be controlled to operate in exclusive SRR mode, exclusive LRR mode, or a combination of SRR and LRR. In the example of LRR operation, the array elements 108 form an array with a larger aperture. In some embodiments, the transmission and receive paths operate using a same antenna array. In these systems, the transmit and receive operations are time division multiplexed or otherwise designed to separate the transmit and receive signals.

Continuing with the description of FIG. 8, during LRR operation, the system 100 transmits during a first time slot 802, after which the scheme injects a guard slot 804, RTT, for smooth transitions between transmit and receive operations, after which a receive time slot 806 is active. The time slots 802, 804, 806 describe a single transmission, reflection and receipt operation. The time slot pattern continues from time slot 808 on. In this way, the antenna system 100 incorporates a TDD frame for operations where the transmit communications, paths, are separated from the receive path 140 while operating using a modulation such as Frequency Modulated Continuous Waveform (FMCW) for radar systems. FMCW is used in a radar sensor to radiate continuous power on the transmit path while changes the frequency of the transmitted signal. In this way, the system modulates a transmission signal in frequency or in phase which enables runtime measurements, including range and relative velocity. In these systems the distance, or range, measurement compares the frequency of a received signal, or echo, to a reference signal, or the transmitted signal. The distance R to a detected object is determined as follows:

$$R = \frac{c \cdot |\Delta t|}{2} = \frac{c \cdot |\Delta f|}{2 \cdot (df/dt)}$$

where c is the speed of light, $\Delta t$ is delay time measured in seconds, $\Delta f$ is the measured frequency difference measured in Hz, R is the distance between an antenna and a detected object measured in meters, and df/dt is the frequency shift per unit of time. If the FMCW incorporates a sawtooth signal, the linear sawtooth frequency change will result in a shift of the echo signal in time creating a frequency difference between the actual frequency and the received signal. The frequency difference is referred to as the "beat frequency." The Doppler frequency is the transition of the frequency of the echo signal with respect to the transmit signal, such as to move the frequency up for an object moving towards the radar or down when the object is moving away from the radar. The FMCW signal also may detect a Doppler frequency $f_D$ caused by speed and measured as a change in the frequency. Other signal formats may also be used, such as triangular signals. The use of FMCW enables information capture in the analog space reducing computational processing power and time which are critical in many radar applications, such as for self-driving vehicles and automated driver assist systems (ADAS).

Returning to FIG. 8, the TDD time frame, or time slot, is constrained to be greater than the longest round-trip time (RTT) of signals from either antenna elements 106 or antenna elements 116. Time slots of format 800 are illustrated sequentially as 802 through 816. The following equation governs the relationship of the time slot size to the RTT.

$$RTT = 2 * Range_{max}/c$$

$$RTT > \max(Tx_{timeslot}, Rx_{timeslot})$$

where c is the speed of light, and RTT time slots are arranged to avoid conflicts in the time domain during transmit and receive modes. In this example, the antenna system 100 has a reconfigurable RF Front End (FE) and supports both SRR and LRR operation; specifically, the RF FE is time-alternatively reconfigured between LRR and SRR. The SRR is a wide beam signal of lower gain, but with fast processing for fast decision making in the proximity of the vehicle. FIG. 1 includes a reconfiguration module 103 adapted to control operation of the system 100.

Figure 2:
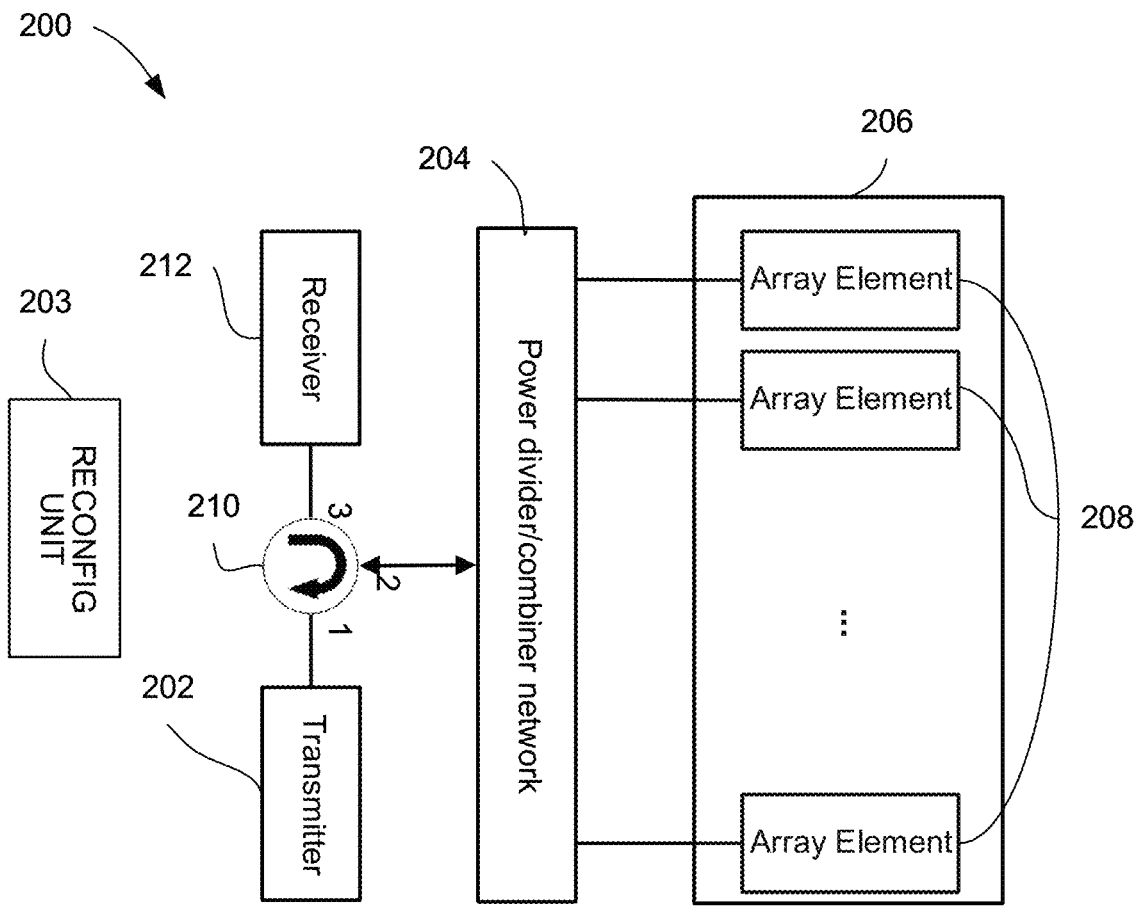
FIG. 2 illustrates an antenna system having unified transmit and receive paths for radar applications, according to embodiments of the present inventions.

Another configuration also implements a TDD scheme where transmit and receive paths share common feed network and array elements. FIG. 2 is a reconfigurable RF FE antenna system 200 having receiver 212 and transmitter 202 coupled to a circulator 210. Alternate embodiments may implement a variety of techniques and structures for TDD operation. In the present embodiment, the circulator 210 is effectively a three-port switch, which acts to keep the transmit and receive operations separate and maintains each operating path in isolation. The circulator 210 is coupled to a power divider and combiner network 204 coupled to the array 206 having elements 208, wherein the array elements 208 are radiating elements. In transmit mode, signals are generated at the transmitter 202 for propagation through the antenna system 200 and the transmit signals are power divided by power divider and combiner network 204 and signals are then sent to array elements 208 of array 206. In the receive mode, signals are received at the array elements 208 of array 206, combined in power divider and combiner network 204 from which the signals propagate to the receiver 212 by way of circulator 210. The power divider and combiner network 204 includes circuitry, function and features to implement each operation for each mode. The circulator 210 may be any of a variety of devices, wherein control determines the direction of signal flow. For transmit path, signals enter at port 1 and exit at port 2 to power divider and combiner network 204. For receive path, signals enter at port 2 and exit at port 3 to receiver 212. The circulator 210 is a non-reciprocal device, indicating that there are only specific paths and directions for operation of the circulator 210. Alternate embodiments may employ other methods and devices to isolate the transmit and receive paths. FIG. 2 includes a reconfiguration module 203 adapted to control operation of the system 200. The reconfiguration module 203 operates in coordination with the switch 210 so as to configure the array 206 for operation in different conditions.

Operation of system 200 proceeds in a time division manner described by the time slot allocations of FIG. 9. As in FIG. 8, the transmissions are separated in time by injecting (intervening) time slots, which are labeled as RTT slots, for LRR mode transmissions. As illustrated in FIG. 8, the RTT time slots separate transmit and receive times for LRR and act to allow time for the transition from transmit to receive configuration. The RTT is a function of the transmission and receive parameters and the characteristics of the switch, including switching time. As illustrated in FIG. 8, each LRR cycle of transmit and receive takes 3 time slots.

Incorporating a multi-mode or multi-range option may be implemented by using the RTT time slots of the LRR function to operate the SRR operation. Such a scheme is illustrated in FIG. 9 where the method of FIG. 8 is expanded to support both LRR and SRR. The time slot format 900 is similar to format 800 starting with a first slot 902 for LRR transmit, a second slot 904 for RTT, a third slot 906 for LRR receive, and the cycle starts again with time slot 908 for a next LRR cycle. The time slot format 900 injects the SRR mode operation by reuse of the RTT time slots of the LRR cycle, specifically, time slots 904, 910 and 916 may be used for SRR operation, and may be used for transmit and/or receive. By optimizing the time slot format for reuse or dual-use of time slots, this time slot format 900 supports both SRR and LRR operation, which in this example may both be implemented with the same antenna system 200.

Operation of a system incorporating time slot format 900 proceeds according to a manner similar to that of time slot format 800 of FIG. 8. The format 900 uses the RTT time slots, intended to allow time for LRR transmissions to switch between transmit and receive, to facilitate SRR transmit/receive. In other words, as these time periods are not used for LRR transmit or receive, they are available to be used for SRR. In this way the RTT guard band period injected for the LRR (allocated to slots 904, 910 and 916) is also the time allocated for SRR operation. In the format 900, the time slot 902 is allocated to LRR transmit signals, the slot 904 is allocated to SRR transmit or SRR receive signals, the time slot 906 is allocated to LRR receive signals and so forth. In this way, each SRR time slot is sandwiched within an LRR cycle, positioned between an LRR transmit time slot and a subsequent LRR receive time slot. By multiplexing SRR and LRR operations, such embodiments provide efficient system operation. In some embodiments, a small guard time slot may also be injected to further separate the LRR and SRR operations as this may compensate for any delays or overlapping function when switching between SRR and LRR modes.

In an automotive application, the ability to switch between SRR and LRR reduces the number of components in a vehicle, as one radar module operates multi-range radar. The SRR and LRR operation may coordinate to anticipate actions in the immediate as well as long distance. The reduced components in a vehicle reduces the potential points of failure. A vehicle has a sensor fusion to receive information from multiple sensors, determine conditions and make decisions about actions and operation. The sensor fusion uses redundancies and cross-checks of the sensed information to detect and avoid failures, responding in real time.

The SRR operation may be used to calibrate the LRR operation and vice versa in real time operation. For example, during highway driving, the SRR operation may provide an in-situ calibration method to ensure that the LRR operation is accurate. In such example a calibration module is configured within or proximate the radar module to control the antenna array, measure signal strength and provide guidance on corrective action. In the examples illustrated herein, beam steering is performed by phase controllers in the transmission lines to the antenna array. To steer the beam the radar applies voltages to phase controllers, wherein each voltage corresponds to an angle with respect to boresight. The voltages may be stored in a look up to be (LUT), may be calculated on the fly or may be predetermined to achieve a desired angular range. For calibration, additional elements enable calibration and adjustment of LUT values for real time calibration.

In some embodiments, the antenna elements may be allocated into subarrays, such as to allocate one subarray for SRR or and another for LRR. In some operations, a subarray is used for LRR while the full array is used for SRR. There are a variety of configurations and operational methods that are implemented with the inventions presented herein, and the described examples and embodiments are provided for clarity and are not meant to be limiting.

Returning to FIG. 2, the reconfiguration unit 203 of system 200 controls operation of the switch 210 changing the transmission path from transmitter to receiver; additionally, the reconfiguration unit 203 also controls the timing of the receiver 212 and transmitter 202. The reconfiguration unit 203 may implement other aspects of control for switching between modes of operation, enabling a single array 206 for transmit and receive operations. The reconfiguration unit 203 in some embodiments controls the array 206 to divide the array elements 208 into subsets to form subarrays.

Figure 3A:
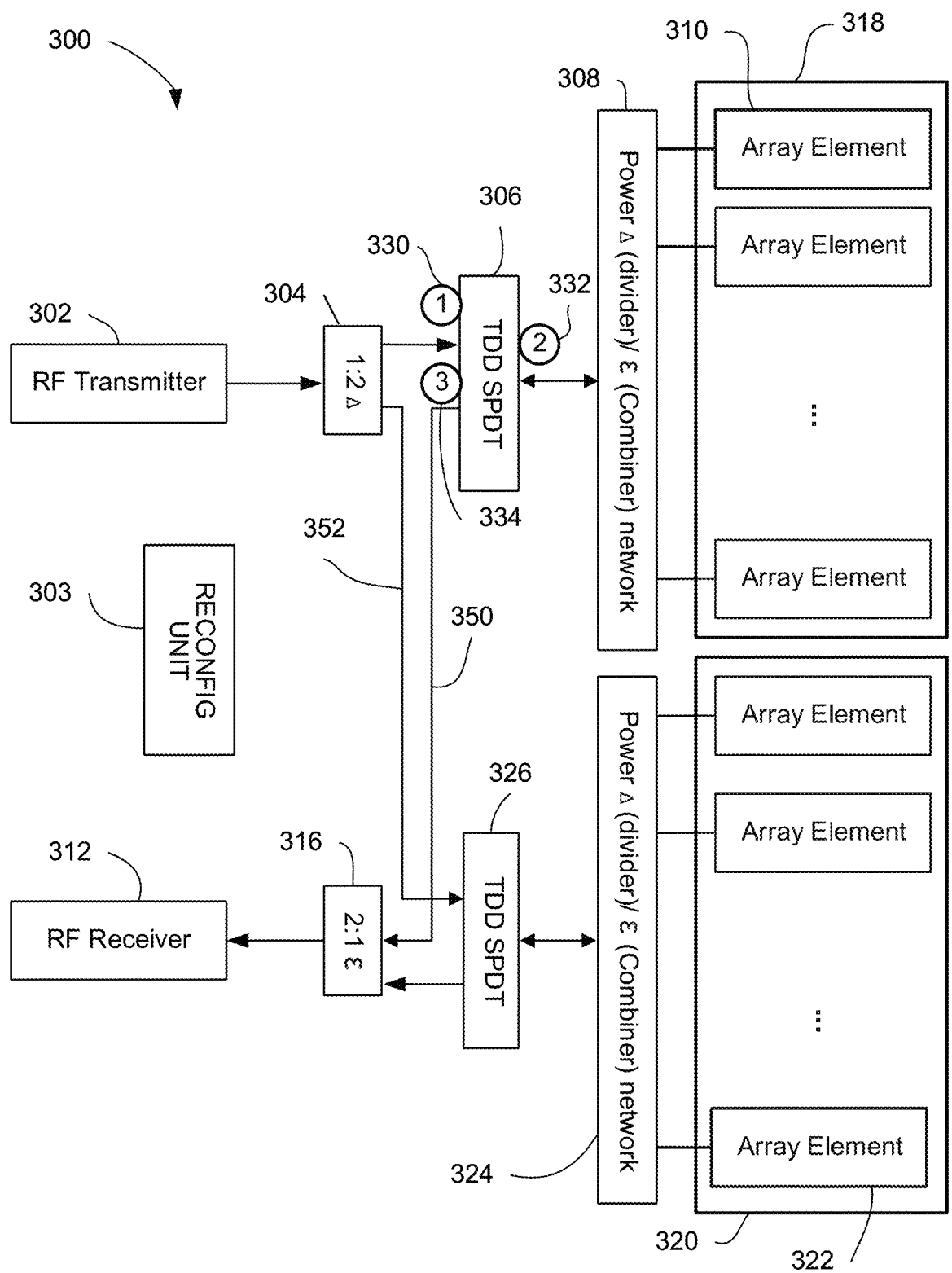
FIG. 3A illustrates antenna systems having separate transmit and receive paths for radar applications and control therefor, according to embodiments of the present inventions.

FIG. 3A illustrates a radar system 300 having separate transmit and receive paths for radar applications and control therefor. An RF transmitter 302 is on the transmission path and RF receiver 312 is on the receive path. The transmission path is from RF transmitter 302 to divider circuit (1:2) 304 to switch 306 that is able to control to connect to different transmission paths for signals for radiation. The switch 306 coupled to a power divider and combiner network, unit 308, coupled to antenna array 318. With this connection, the transmission path is as given in FIG.

The switch 306 is a single-pole double-throw switch (SPDT) is a switch that only has a single input and can connect to and switch between two outputs. The SPDT has one input terminal port and two output terminal ports; an SPDT switch are used in a variety of functions in a circuit or application, including as an on-off switch or to connect two paths for circuit function. In the present examples the SPDT switch is used to connect multiple paths and configurations to enable multi-use of sets of antenna element arrays. The ability to increase the antenna element set up provides flexibility and improved performance of an antenna systems, such as in a radar unit.

In this system 300, the RF transmitter 302 on the transmit path is coupled to a (1:2) divider circuit 304 and switch 306, illustrated here as an SPDT having a single input port 330, also labeled as port 1, and two output ports or terminals 332, 334, also labeled as 2, 3, respectively. The output port 332 is coupled to power divider and combiner network unit 308; and the output port 334 is coupled to (2:1) combiner circuit 316 of the receive path via transmission line 350. The power divider and combiner network 308 is coupled to array elements 310 of array 318, which is the transmit array on the transmit path and may be used independently for transmission or in combination with array 320 for transmission and/or reception. The array elements 322 of array 320 are coupled to power divider and combiner network 324, which is coupled to switch 326 on the receive path. The array 320 is the receive array of the receive path and may be used independently for reception or in combination with array 318 for reception and/or transmission. The receive path also includes a combiner 316, which is a 2:1 combiner of signals and is coupled to RF receiver 312. FIG. 3A includes a reconfiguration module 303 adapted to control operation of the system 300.

The system 300 may operate concurrently as separate receive and transmit paths using arrays 320, 318, respectively. In another mode, the system 300 may operate in a time division manner, wherein transmission uses arrays 320, 318 to transmit signals originating in RF transmitter 302, and propagating through power divider and combiner networks 308, 324 concurrently to arrays 318, 320 acting as a single transmit antenna. This reconfiguration enables the antenna system 300 to transmit from more antenna elements. The switches operate to create the paths used for each mode. The switches 306, 326, the divider 304 and the combiner 316 have connections enabling such reconfiguration. For clarity, the switch 306 is detailed as having three terminals, similar to other elements and devices, which is controlled so as to achieve the desired path and configuration. The paths 350, 352 couple various modules to enable any of a variety of modes.

Figure 10:
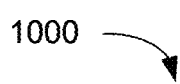
FIG. 10 illustrates a timing example for short range mode of an antenna system to achieve concurrent transmit and receive within a single time period, according to embodiments of the present inventions.

For transmit operation, the transmit signal is generated by RF transmitter 302 and provided to the 1:2 divider 304, which acts to split the signal for propagation over the transmit path to array elements 310 and over the receive path (in reverse direction) to array elements 322. For receive operation, signals are received at array elements 310, 322 and propagate through the system as illustrated, wherein the signal is received at switch 326 and provided to combiner 316. In this operation, all of the antenna elements 318, 322 of antenna system 300 are used for reception. FIG. 10 illustrates a timing diagram for an example SRR mode operation for a system, such as system 300. In each time slot 1002, 1004 through 1018 and so forth, the SRR may be configured as a transmit antenna, receive antenna, or both transmit and receive concurrently.

Figure 3B:
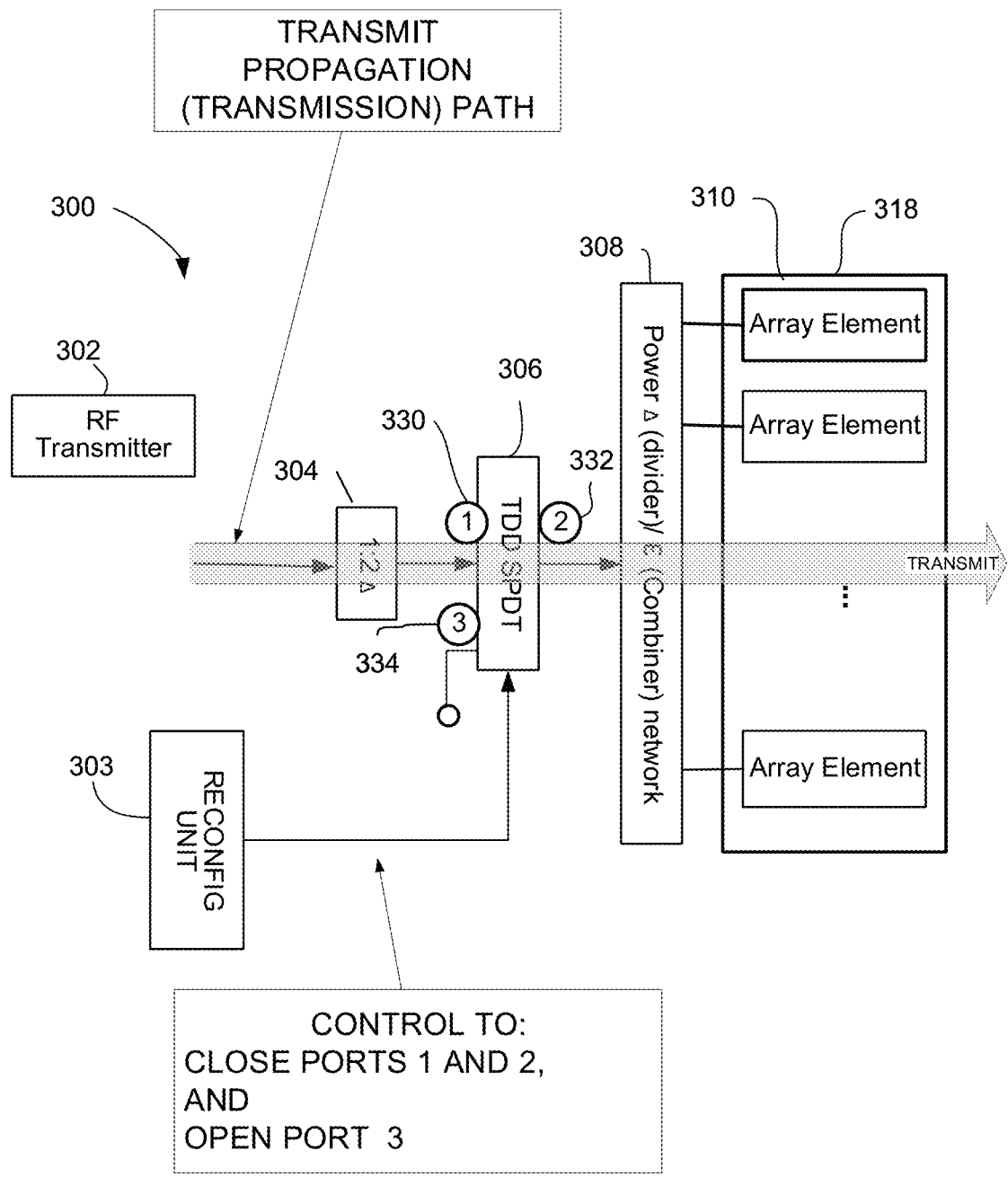
FIGS. 3B to 3F illustrate components of an antenna systems as in FIG. 3A during operation, according to embodiments of the present inventions.

Some examples of operation of the system 300 are illustrated in FIGS. 3A to 3F. In these illustrations only portions of the system 300 are provided. In these figures the path of propagation is indicated by a shaded arrow(s). FIG. 3B illustrates the transmit operation directly from RF transmitter 302 to divider 304, into port 1 of switch 306 and out port 2, and through power divider/combiner unit 308 to array 318 for radiation in transmit mode. For this operation the ports 1 and 2 are closed to complete the circuit indicated and port 3 is an open circuit.

Figure 3C:
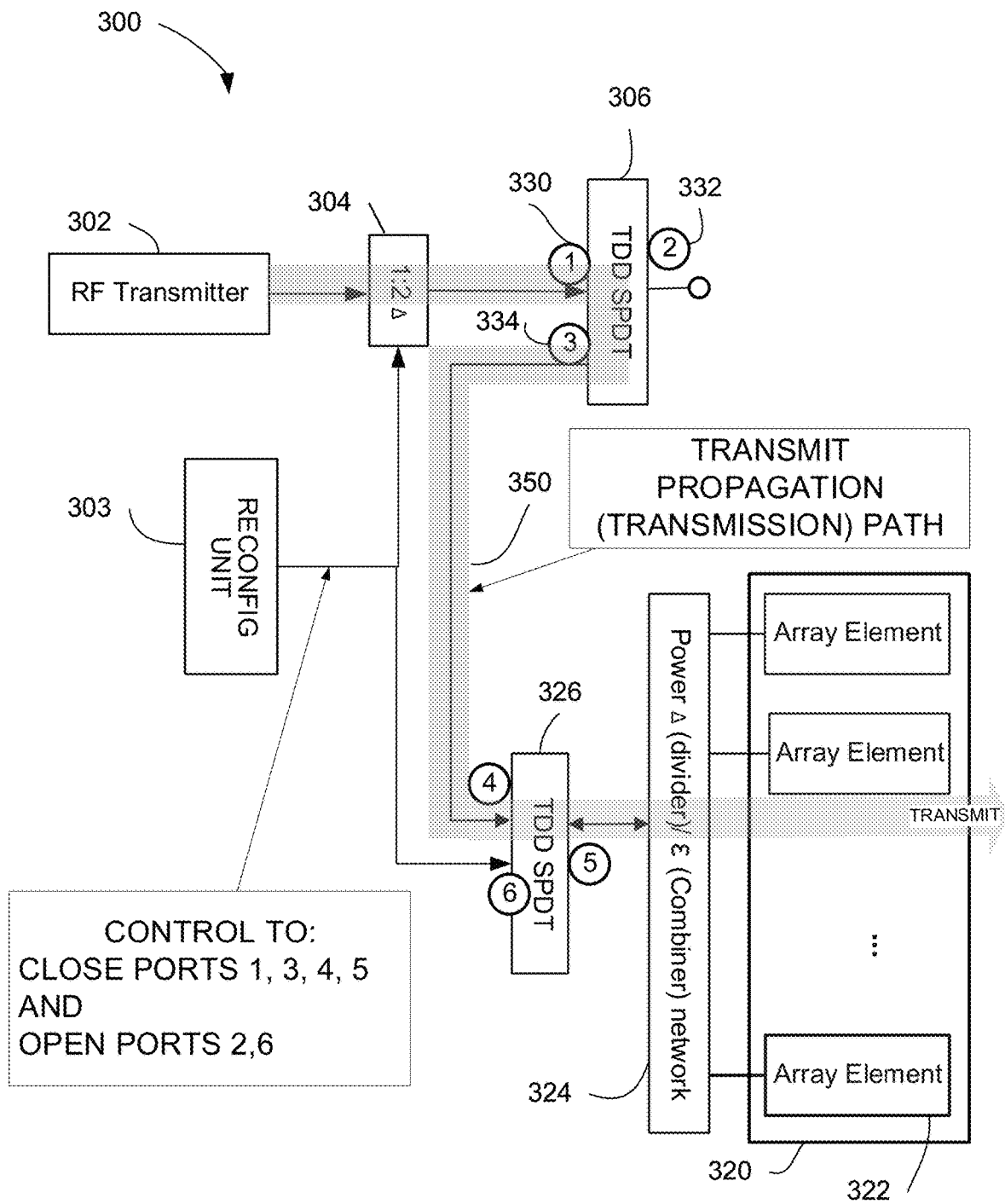

FIG. 3C illustrates the use of array 320 for transmissions from RF transmitter 302. The transmission path is indicated with ports 1 and 3 closed to complete a circuit via transmission line 350 to switch 326 to power divider/combiner unit 324 for transmission from array 322. In this operation, ports 1, 3, 4, 5 are closed and ports 2 and 6 are open. The position or characteristics of array 320 provide enhanced operation.

Figure 3D:
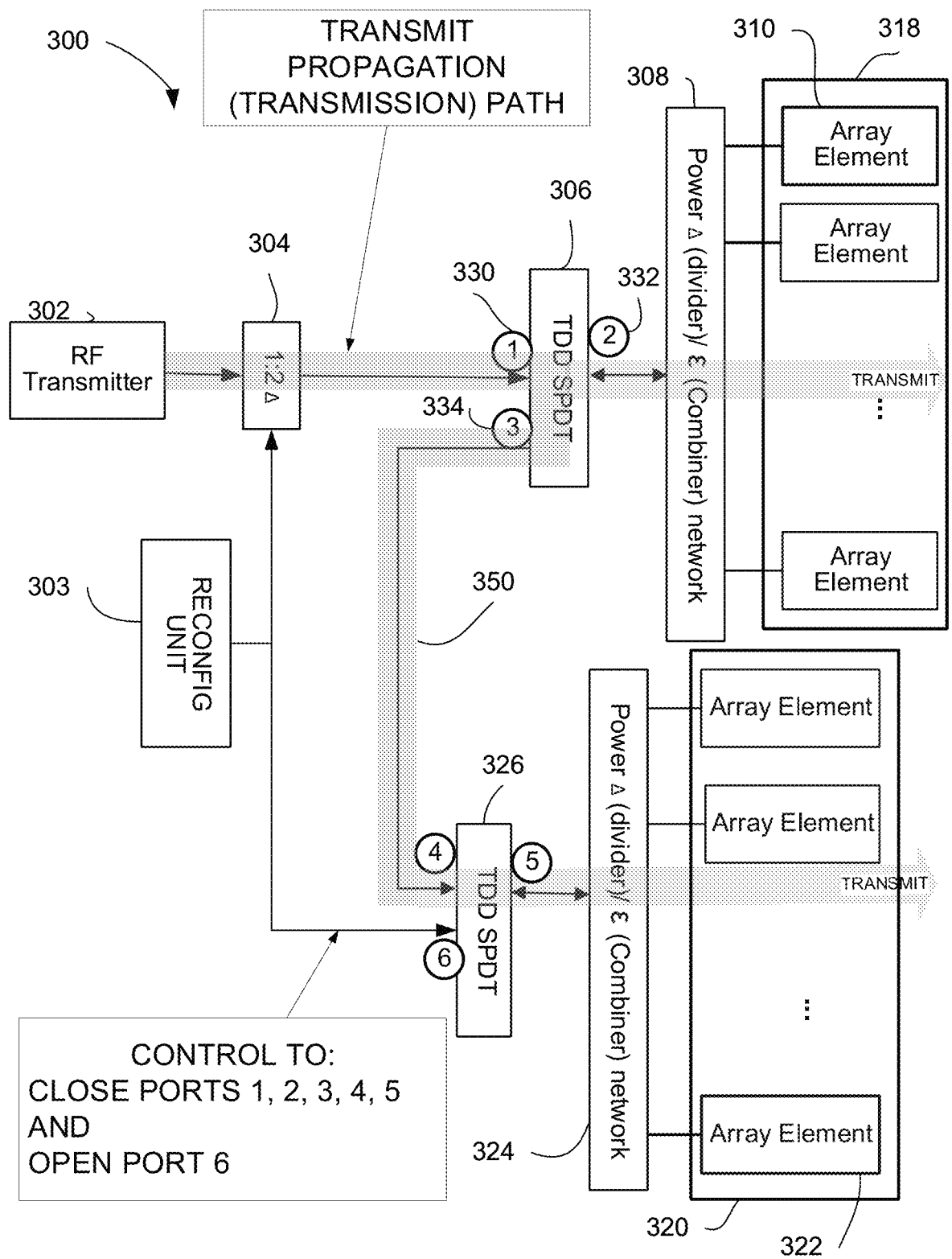

FIG. 3D illustrates transmit operation using both arrays 320, 318. The shaded path illustrates the multiple paths through the system. Here the switch 306 directs the transmission signal to both arrays 318, 320 increasing the aperture of the system 300. Note the arrays 318, 320 may be divided into subarrays for transmission of multiple beams.

Figure 3E:
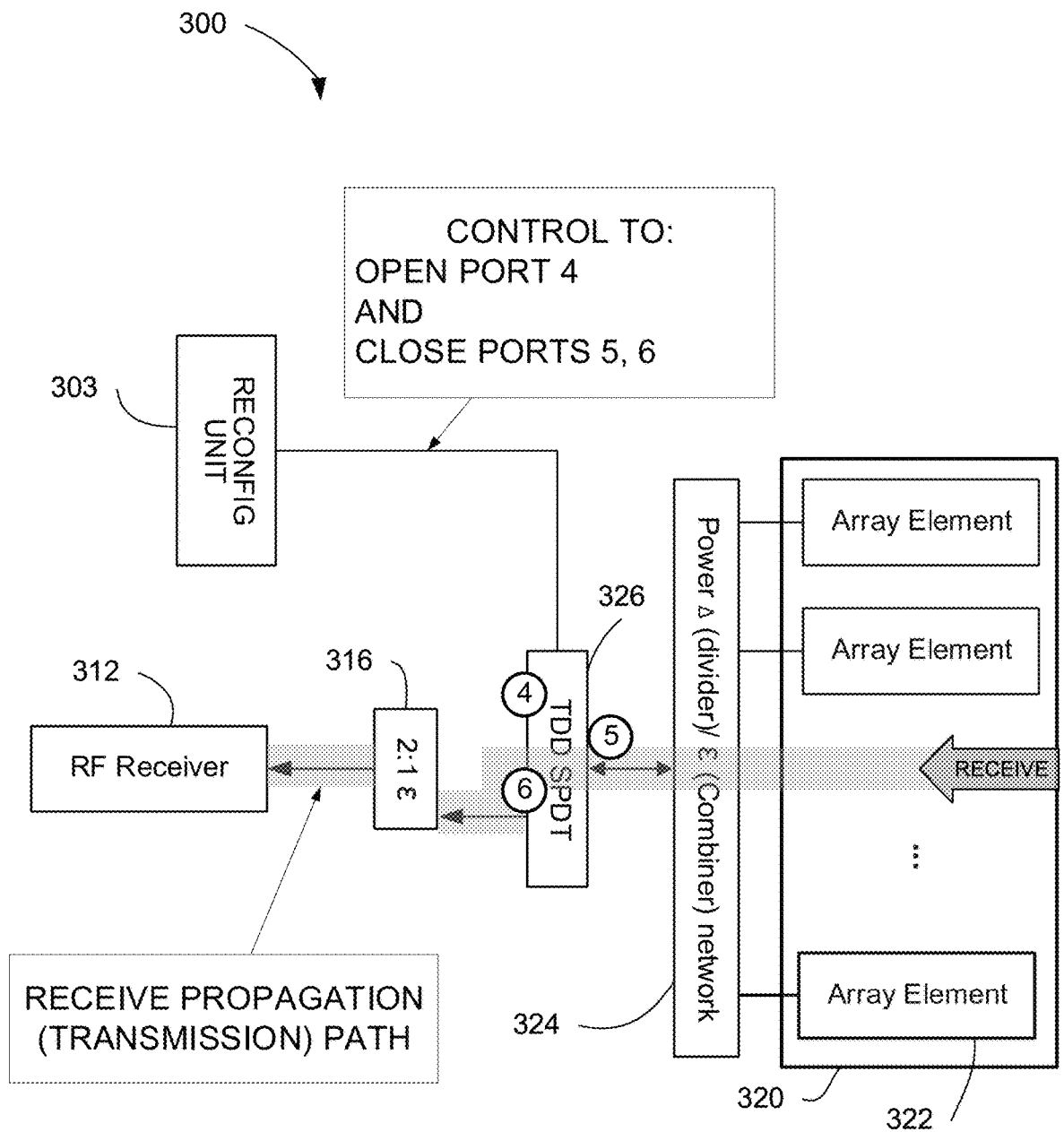
Figure 3F:
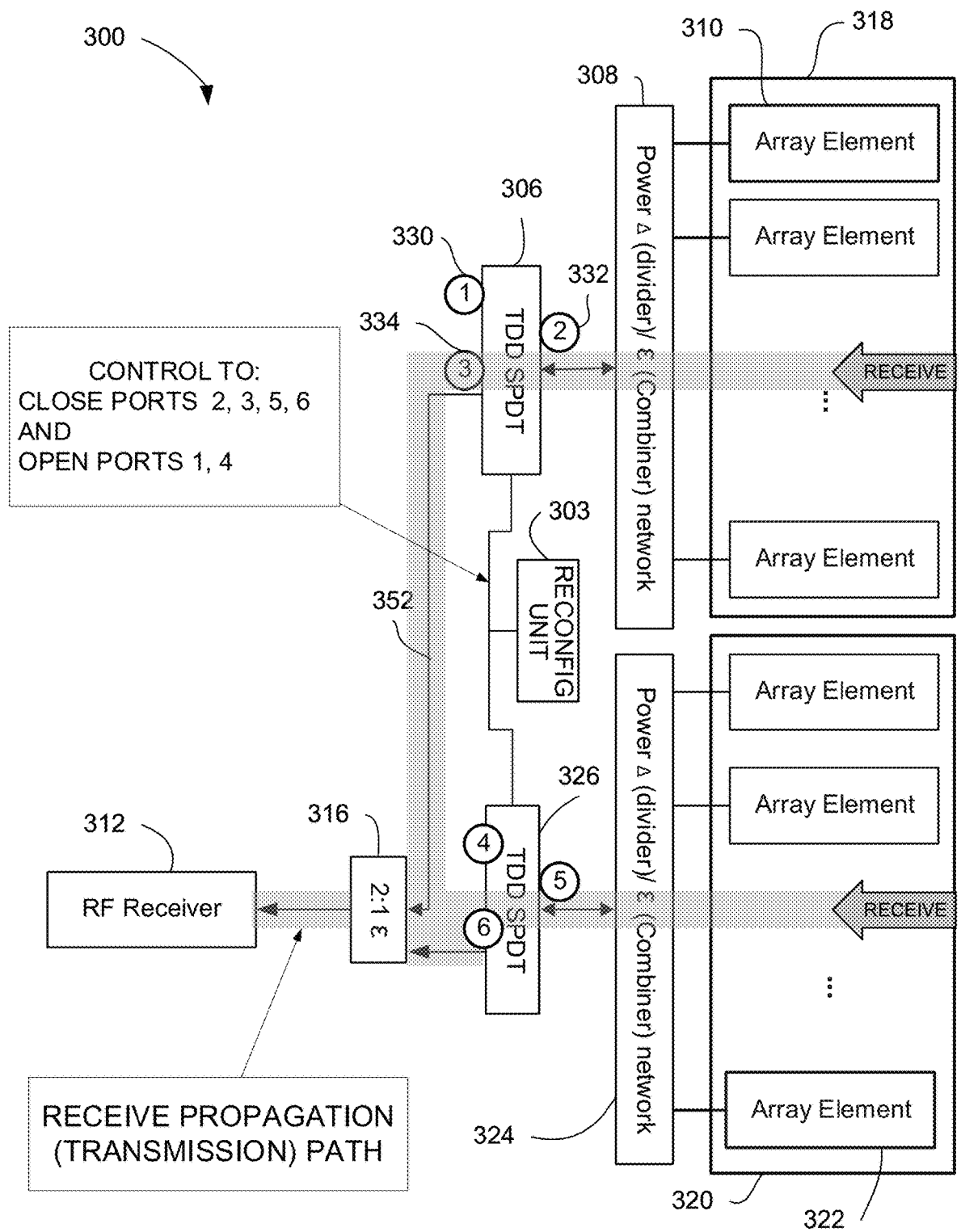

FIG. 3E illustrates receive operation of the system 300 from array 320. As in the previous examples, the reconfiguration unit 303 controls operation of the switches 306, 326 to reconfigure the modules within system 300. The receive path is indicated by the shaded path. FIG. 3F also illustrates receive operation, where reconfiguration unit 303 sets multiple arrays 318, 320 for receiving signals. The shaded paths indicate the receive paths created by the switches 306, 326 and signals propagate therethrough to the RF receiver 312.

There are other operations and configurations that may be implemented in system 300 with reconfiguration unit 303, which may be a digital controller, an analog controller or a hybrid. In some embodiments, the reconfiguration is triggered by conditions determined in the system 300 or in a central controller such as a sensor fusion in a vehicle. The reconfigurability of the system 300 provides flexibility in application.

Figure 4A:
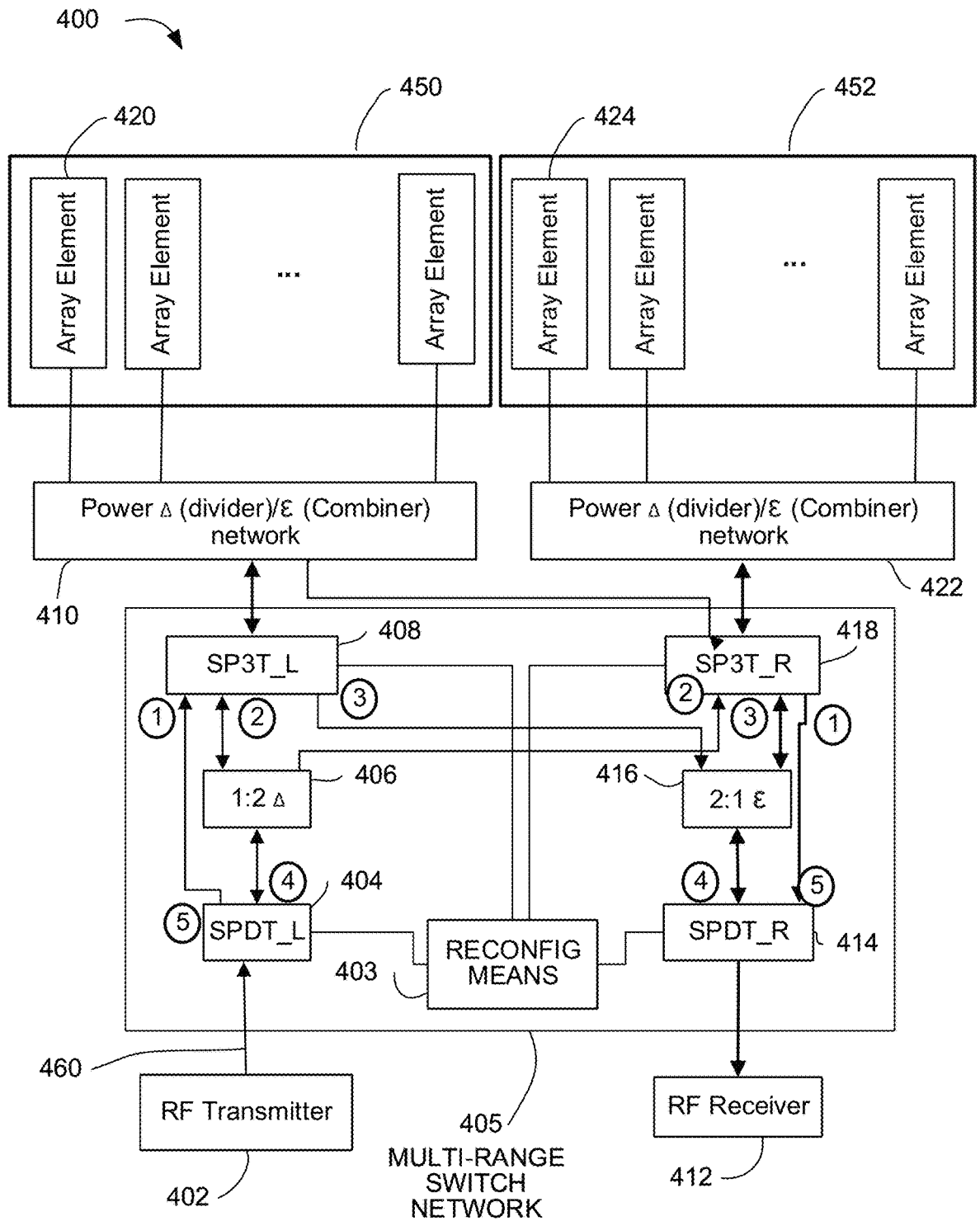
FIG. 4A illustrates an antenna system, according to embodiments of the present inventions.

System 400 of FIG. 4A functions as a reconfigurable RF Front End (RFFE) for automotive radar operating in multi-range modes, including LRR and SRR modes. The system 400 includes antenna arrays 450, 452, power divider/combiner units 410, 422, multi-range switch network 405 with reconfiguration unit 403, RF transmitter 402 and RF Receiver 412. For transmit operations the RF transmitter 402 is active and the RF receiver is inactive. The Tx RF signal 460 is divided into multiple portions by a (1:2) divider 410; a portion of the Tx RF signal 460 goes to power divider 410 and another portion goes to power divider/combiner unit 422. In this way, the RF Tx signal 460 is transmitted from multiple antenna arrays 450, 452. The system 400 may be used whereby a subset of the array elements 420, 424 are used for transmission over-the-air.

For receive operations of system 400, the RF transmitter 402 is inactive and the RF receiver 412 is active. The signals are received at both antenna arrays 450, 452 on the receive path to respective power divider/combiner units 410, 422 and to multi-range switch network 405. The switches 408, 418 are controlled by reconfiguration unit 403, which, in this receive operation configures both switches 408, 418 to couple to combiner 416. Specifically, the reconfiguration unit closes port 3 of switch 408 and port 3 of switch 418. Signals from each path are combined in (2:1) combiner 414 and go to RF receiver 412.

The structure and configuration of system 400 of FIG. 4A, including reconfiguration means 403, are similar to components of system 300. Reconfiguration means 403 acts to coordinate multiple switches, 408, 404 on the transmit path and switches 418, 414 on the receive path. This enables reconfiguration of the system with a single point of control. In the present embodiments and examples the switches are multiple terminal switches.

As in FIG. 4A, a single-pole three-terminal switch (SP3T) 408, is coupled to RF transmitter 402 on the transmit path. The SP3T 418 is coupled to the RF Receiver 412 on the receive path. The multiple switches enable a variety of configurations, and provide transmit and/or receive to operate independently on separate paths. In some embodiments, system 400 operates transmit and receive in a TDD manner, while in other examples different operational schemes are implemented on the reconfigurable system 400.

As discussed herein, FIG. 4 reconfiguration means 403 controls configuration of the receive and transmit paths and therefore operation of the system 400; specifically, reconfiguration means 403 provides control for switches and mechanisms in the multi-range switch network 405. The configuration determines the integration of transmit and receive as well as the range and characteristics of the signals transmitted from antenna element arrays 450, 452.

Figure 11:
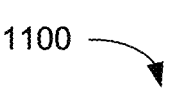
FIG. 11 illustrates switch operation for an antenna system to achieve short-range and long-range operation, according to embodiments of the present inventions.

A table of possible operational modes is illustrated in FIG. 11 to set up the configuration for three LRR modes. A first mode operates transmit and receive separately. A second mode operates transmit, and a third mode operates receive.

Figure 4B:
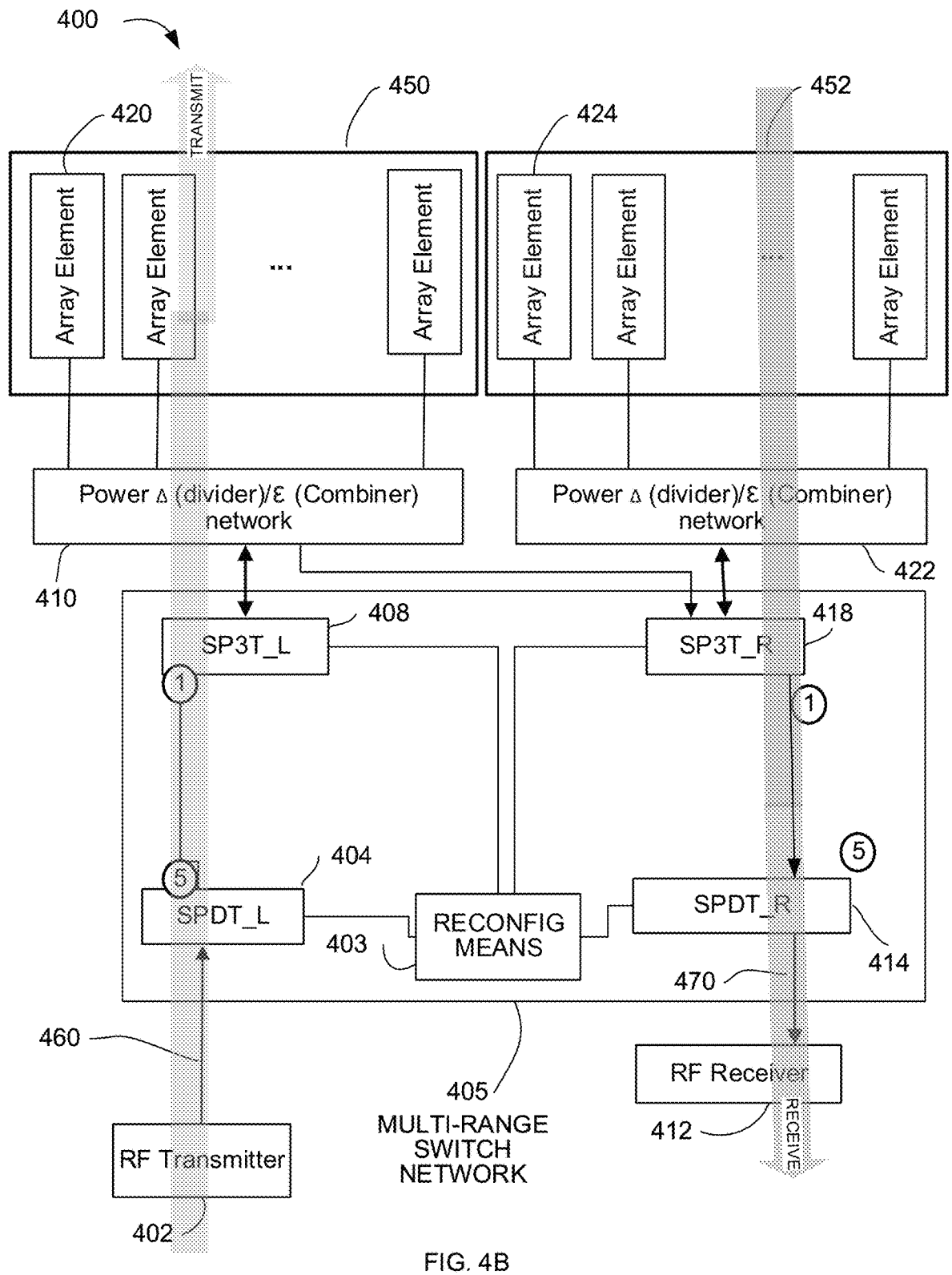
FIGS. 4B to 4D illustrate components of an antenna system as in FIG. 4A during operation, according to embodiments of the present inventions.

FIG. 4B illustrates a first operational mode providing separate transmit and receive paths indicated by shaded arrows. Reconfiguration means 403 establishes a path from switch SPDT 404 (terminal 5) to switch SP3T_L 408 (terminal 1); the transmit path bypasses divider 406 and the entire transmit signal goes to array 450. This is a transmit path for the transmit signal 460 to a portion of the array elements of the system 400. In this first operational mode, the receive path is from array 452 to the RF Receiver 412. The receive includes power divider/combiner module 422, which is coupled to SP3T_R 418. From SP3T_R 418 (terminal 1) the combined signals go to switch SPDT 414 (terminal 5) and to RF receiver 412. In this way, the RF transmitter 402 and the RF receiver 412 may act concurrently with each incorporating only a portion of the total antenna elements in arrays 450, 452.

Figure 4C:
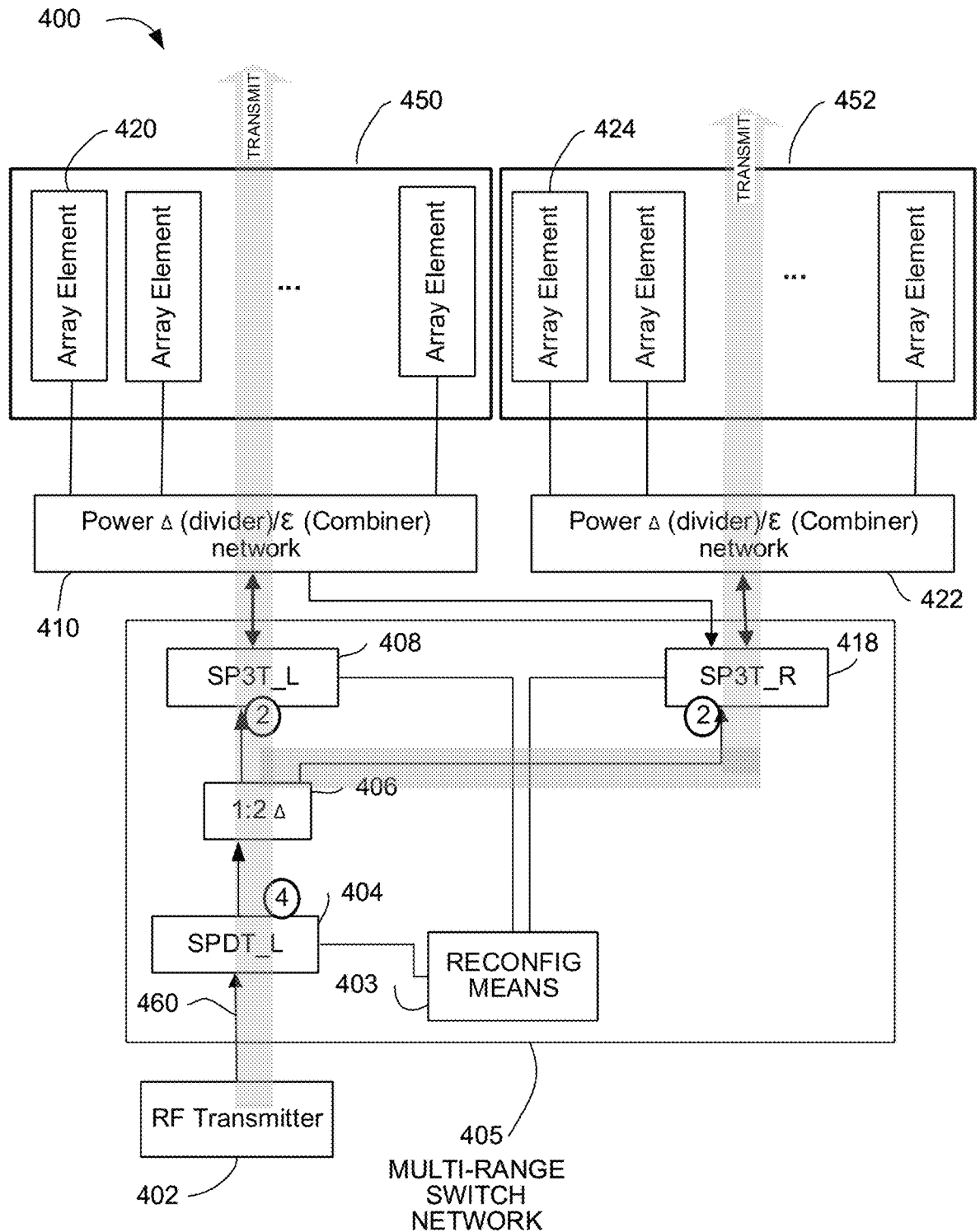

A second operational mode, FIG. 4C, expands the transmit antenna to include array 452. The transmit path includes RF Transmitter 402 to SPDT 404, which outputs signal at SPDT 404 (terminal 4) and divides the signal at divider 406, sending part of the signal to SP3T_L 408 (terminal 2) and another portion to SP3T_R 418 (terminal 2). The transmit signal is transmitted from all (or some) of the array elements 420 and 424. In this way, when the RF transmitter is active, and the RF receiver is inactive.

Figure 4D:
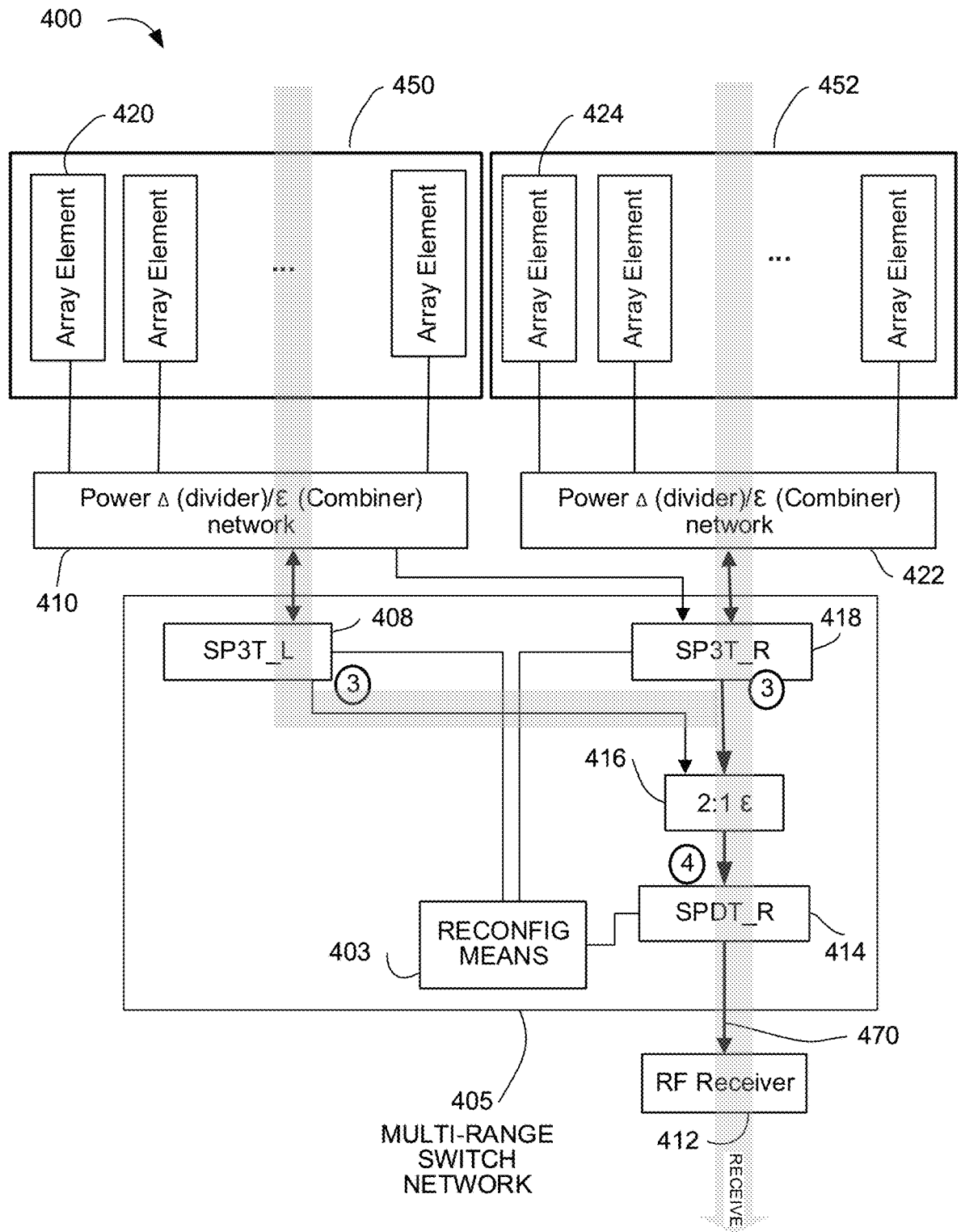

A third operational mode, FIG. 4D, establishes a receive path from all of the array elements 420, 424 through SP3T_L 408 (terminal 3) and SP3T_R 418 (terminal 3) to combiner 416 and then to SPDT 414 (terminal 4) to RF receiver 412. This enables reception by all of the array elements of the system 400. A variety of combinations are possible to use all or a portion of the array elements 420 and 424 for transmit, receive or duplex. FIG. 11 illustrates the switch configurations associated with these various scenarios of system 400 illustrated in FIGS. 4B to 4E. In the illustrated examples, not all components are illustrated to provide clarity for each operation. Each of the switches 404, 414, 408, 418 has ports or terminals that are controlled by reconfiguration means 403 to open or close. When a port is open it is not connected and is in an open circuit state. When a port is closed it is connected to the signal propagation path and is in a closed circuit state.

Figure 5:
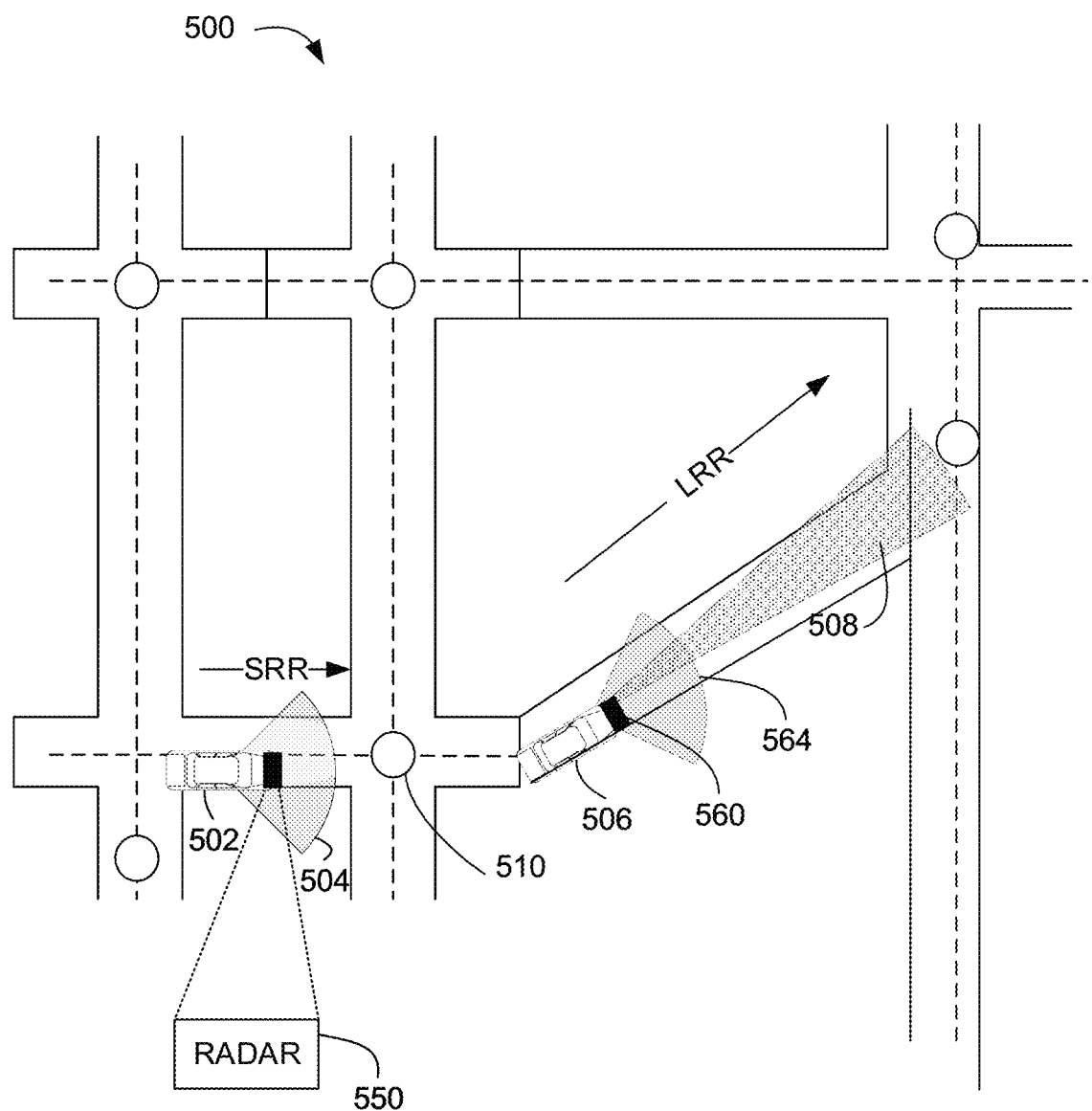
FIG. 5 illustrates a vehicle navigating a traffic environment having a reconfigurable RF Front End for a radar system, according to embodiments of the present inventions.

FIG. 5 illustrates a traffic situation 500, where vehicles 502, 506 navigate roads in an environment. The vehicle 502 includes a radar module having reconfigurable SRR and LRR capabilities. When approaching a corner 510, vehicle 502 configures the radar system for SRR operation, as illustrated by radar beam 504. In a less congested area, the vehicle 506 configures the radar for LRR operation, as illustrated by beam 508. The vehicle 506 may see the need to switch between the modes from SRR 564 to LRR 508. The switching between operating modes may be according to a predetermined scheme, where SRR operation occurs for a percentage of the time period and LRR occurs for the remainder of the time period. In some embodiments, the proportion of time the radar uses SRR and LRR may change dynamically based on conditions. The radar units 550, 560, steer the beam through a range of angles, such as illustrated in 580. The radar units 550, 560 form the transmission beam and steer the beam across the path of the vehicle generating and controlling the beam according to the object detection requirements of a vehicle. This scanning may be done according to a predetermined pattern or may adjust dynamically in response to detected objects, empty spaces and other conditions. The radar units 550, 560 detect objects in the path of the vehicle; the sensed data is provided to a sensor fusion unit (not shown) that receives sensed data from a variety of sensors in a vehicle 502, 506. The sensor fusion uses this information to determine control of a vehicle. The sensor fusion sends information to ADAS modules, such as for operation of cruise control, blind spot detection and so forth. When an object is detected, the sensor fusion may change course of an autonomous vehicle, may change the speed of the vehicle or may take no action if the object will be avoided.

Figure 6:
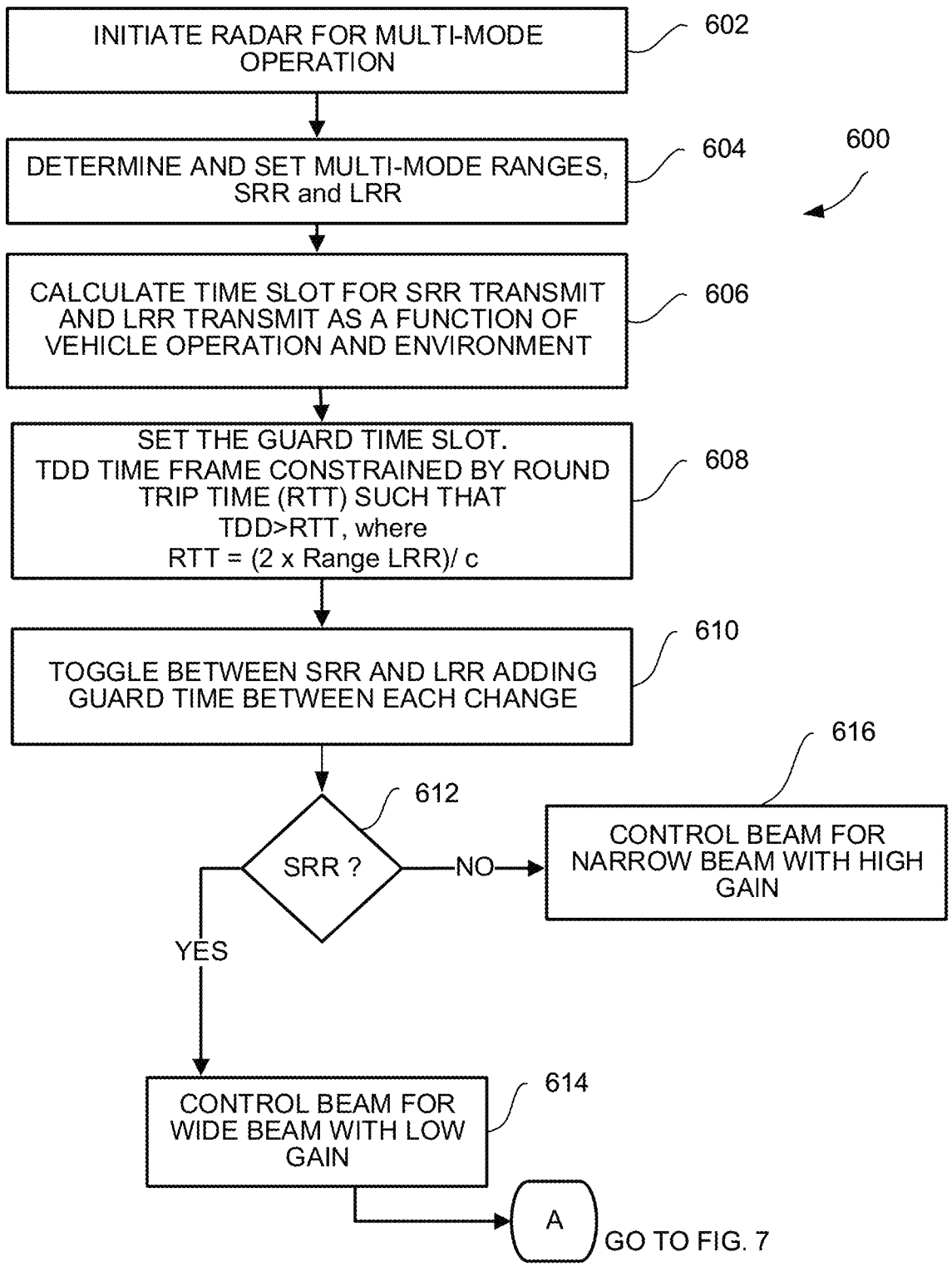
FIGS. 6 and 7 illustrate a method for controlling an antenna system to achieve short-range and long-range operation, according to embodiments of the present inventions.

FIG. 6 illustrates a method 600 for implementing a reconfigurable radar module by initiating a multi-mode operation, 602, wherein each mode corresponds to a range of detection. There are ranges associated with each of the SRR operation and LRR operation. In some embodiments additional range options and modes are available. The process determines and set the multi-mode ranges for SRR and LRR, 604. In the present embodiment, SRR and LRR are distributed over time intervals. The process 600 calculates time slots for SRR transmit and LRR transmit as a function of range, $Range_{SRR}$ and $Range_{LRR}$, respectively, 606. The ranges are determined by vehicle operation and environment, 606.

In operation, SRR and LRR are allocated to different time slots. A TDD time frame is constrained by the round trip time (RTT) of the longest radar return, 608, given as:

TDD>RTT

RTT=2*$Range_{LRR}$/c.

The time slots are allocated so that the system toggles between SRR operation and LRR operation, 610, with a guard band to allow each transition. The transitions are done by switching and reconfiguration means. The guard time slot, 608, is calculated to allow switching time. When in LRR mode, 612, processing is in LRR mode and controls the antenna for a wide beam having low gain, 614. When in SRR mode, 612, the process controls the antenna for a directed beam of narrow width and high gain, 616. The process continues to FIG. 7. When in SRR mode, the process determines if there are separate transmit and receive paths and antenna elements and determines if the transmit antenna is active, 624. If the antenna array elements are duplexed, then the process activates a switch for RF control, 622.

Figure 7:
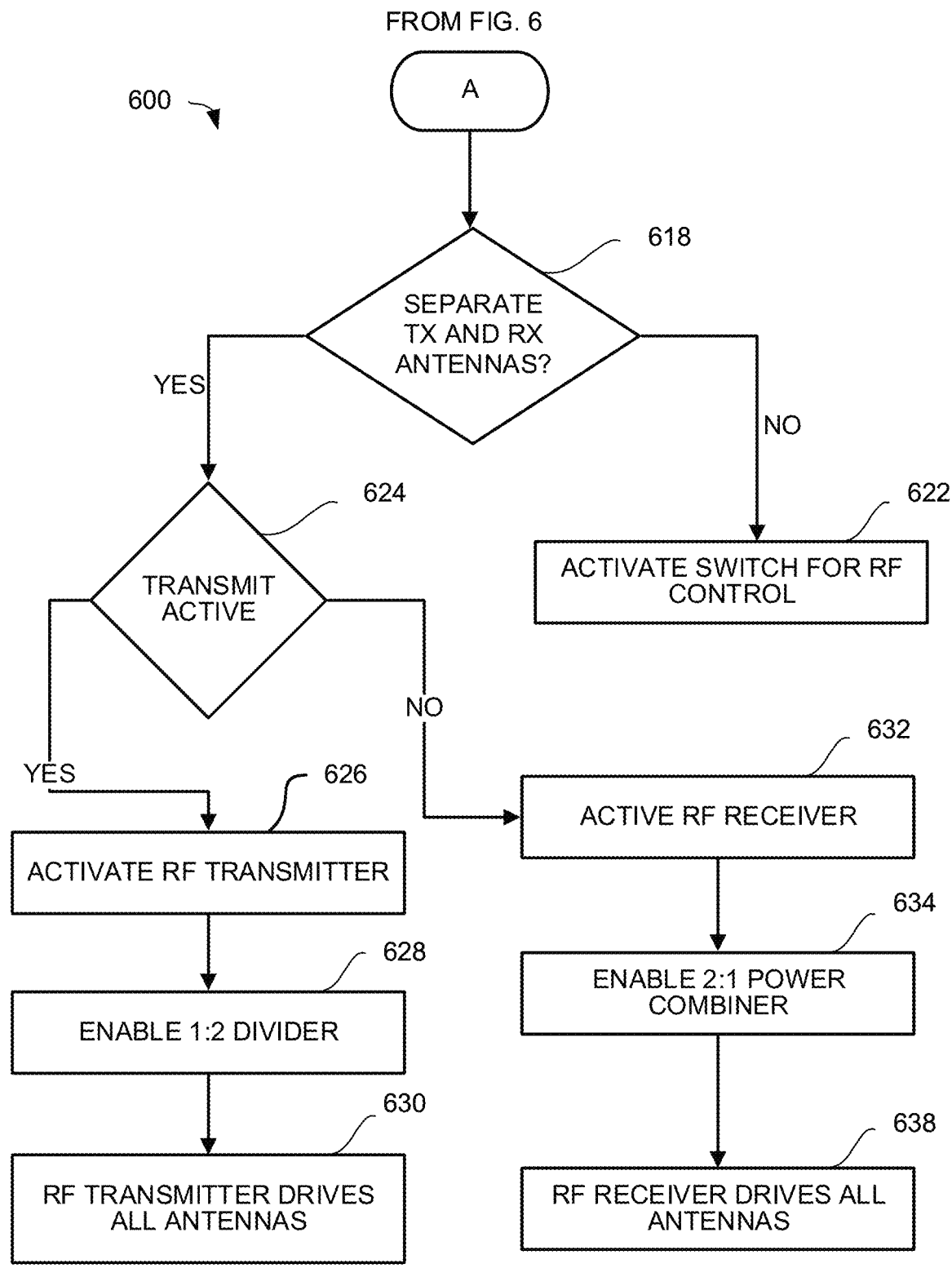

Continuing with FIG. 7, for active transmit processing, 624, the system activates an RF transmitter, 626, enables the 1:2 (or other division parameters) divider, 628, and the RF transmitter drives all of the array elements, 630. It is possible that this transmit process may use a subset of the total array elements, depending on the application. For example, the RF transmitter may select elements from each array or use the entire array to create subarrays that may be used for different transmission beams. If the receive processing is active, 624, the process then activates the RF receiver, 632, enables a signal combiner, 634, and the RF receiver drives all the array elements, 638. In the examples illustrated, the signal combiner and the divider, such as in FIG. A 416, 406, respectively, are given as 2:1 and 1:2; alternate embodiments may implement additional arrays or subarrays and other configurations that may incorporate other ratios.

FIG. 10 illustrates SRR operation in a system, such as system 100 of FIG. 1, system 300 of FIG. 3 or system 400 of FIG. 4, where both transmit and receive operation occur concurrently through separate transmit and receive paths. Here scenario 1000 implements SRR in each time slot. The range control is fixed and does not reconfigure during SRR operation. As indicated, slots 1002 through 1018 and continuing are used for SRR transmit/receive mode. This corresponds to operation similar to that illustrated in FIG. 3F, where signal is received at arrays 318 and 322 for processing at RF receiver 312. The TDD SPDT 306 and TDD SPDT 326 are configured by reconfiguration unit 303. The reconfiguration unit may be implemented in software and housed where convenient or expedient given a system or vehicle design. The reconfiguration decision and control may be implemented in the sensor fusion module that has access to information from the multiple sensors and is therefore able to make a decision as to range and mode of operation.

FIG. 11 illustrates the scenario corresponding to alternate transmit and receive operations to enable SRR or LRR operation of system 400 as in FIG. 4. The table identifies the ports that are closed to reconfigure the circuits for operation. For a first operation, labelled normal, transmit and receive are processed separately. This means that the array 450 is used for transmit and the array 452 for receive. This is illustrated in FIG. 4B with transmission signal 460 on the transmit path through port 5 of SPDT_L 404 and port 1 of SP3T_L 408. The table indicates which reconfigurable ports within multi-range switch network 405 and on the transmit path are closed ports or active; ports not on the table are open or inactive. Similarly, on the receive path, port 5 of SPDT_R 414 and port 1 of SP3T_R 418 are active. The other ports within multi-range switch network 405 are inactive. The shaded paths indicate the transmit and receive paths.

Continuing with the table of FIG. 11, for LRR Tx only mode, port 4 of SPDT_L 404, port 2 of SP3T_L and port 2 of SP3T_R are active. FIG. 4C illustrates this scenario using both arrays 450, 452 for transmitting signals. FIG. 11 includes another scenario for LRR Rx only mode, where reconfiguration means 403 activates port 4 of SPDT_L 414, ports 3 of SP3T_R 418 and port 3 of SP3T_L 408. The other ports are inactive. The illustrated scenarios highlight the active components and the figures therefore do not include all of the components of FIG. 4. There are a variety of reconfigurations and operational modes available with the present inventions.

Figure 12:
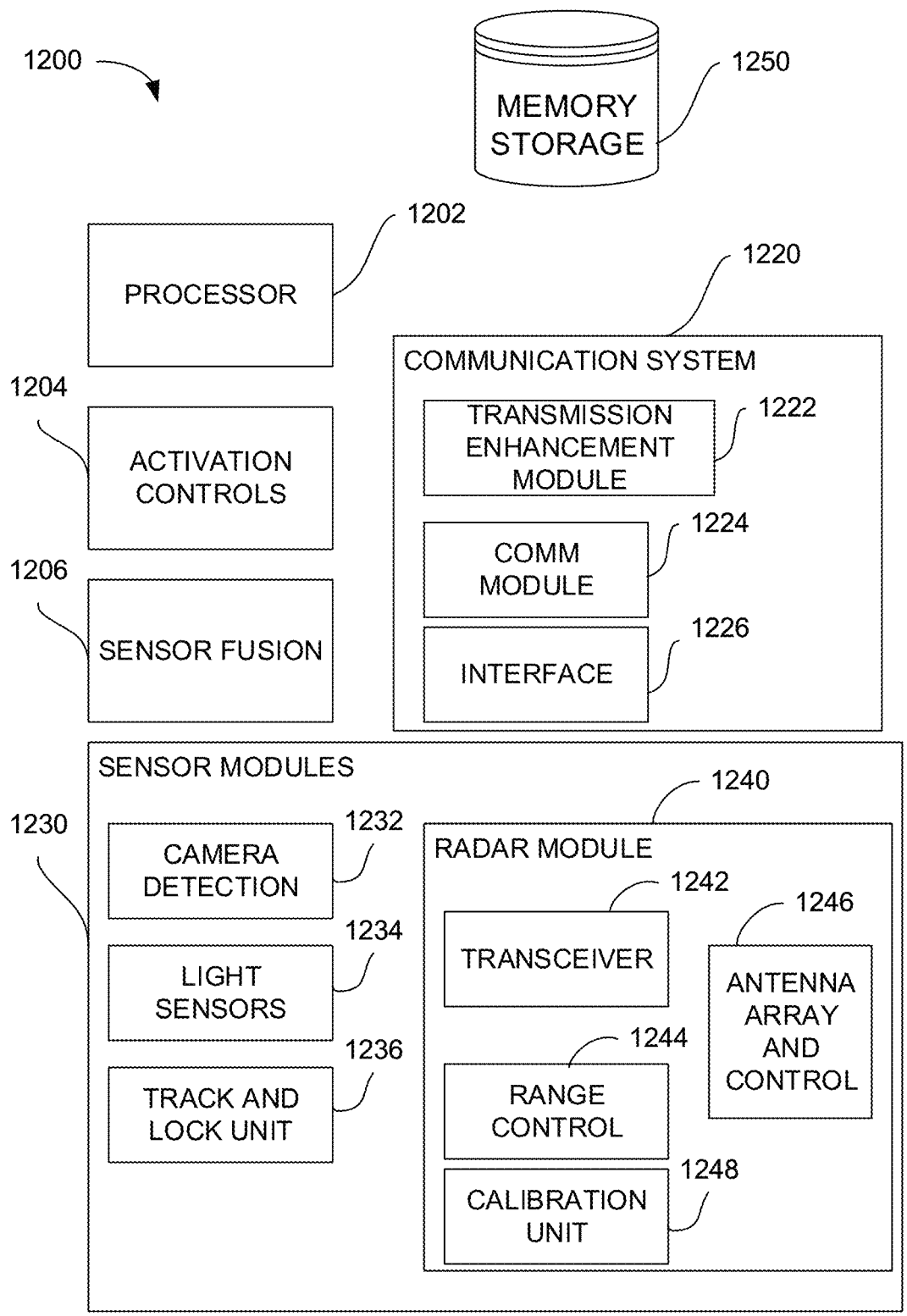
FIG. 12 illustrates vehicle system, according to embodiments of the present inventions.

FIG. 12 is a system diagram of a sensor system 1200 for a vehicle having a set of sensor modules 1230 and a sensor fusion 1206. To achieve full autonomy in a vehicle requires a variety of sensors to ensure the safety of the driver, passengers and other vehicles. The example given is for clarity of understanding. Each application has specifications, requirements and constraints. The information capture from sensors, and the type of sensors, are specific to these conditions. In a trucking system, the radar module will be asked to perform over a range of angles both horizontal (azimuth) and vertical (elevation) that is different than for a golf cart or sedan.

In the illustrated example of FIG. 12, sensor modules 1230 includes a radar module 1240, a camera detection module 1232, light sensors 1234 such as a lidar system, and a track and lock unit 1236 for tracking the path, movement or progress of a vehicle. The radar module 1240 includes a transceiver 1242 and an antenna array and control unit 1246. A range control unit 1244 reconfigures the radar module 1240 for multi-range radar operation. The range control 1244 is the reconfiguration unit of the radar module 1240 and controls transition mechanism, such as a switch. The radar module also includes a calibration unit 1248 for in situ calibration of the radar unit. The sensor fusion 1206 receives measurements and indications from sensor modules 1230. The sensor fusion makes decisions based on the sensor information for control of actions in the vehicle through activation controls 1204. The system 1200 also includes a memory storage unit 1250 and a processor 1202.

Figure 13:
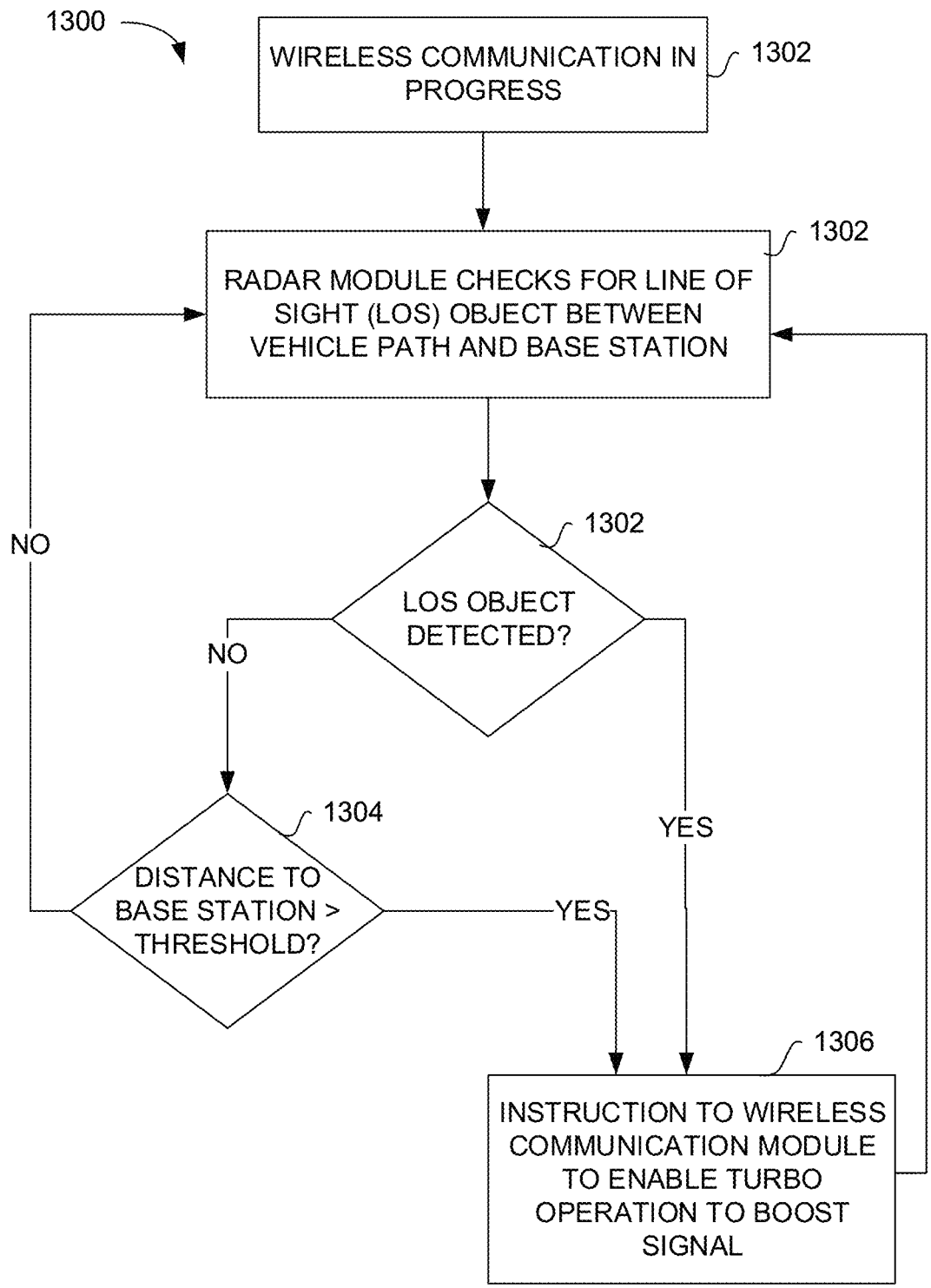
FIG. 13 illustrates a method for operation of a vehicle system as in FIG. 12, according to embodiments of the present inventions.

The system 1200 includes a communication system 1220 that facilitates wireless communication from the vehicle. A communication module 1224 is coupled to transmission enhancement module 1222, such as a multi-range repeater, to control wireless communications for a variety of conditions and environments. While in motion through an environment, a vehicle experiences structures that interfere with wireless signals to a base station. The unit 1222 of some embodiments is a repeater that increases the gain of a signal to improve the quality and continuity of transmissions and communications. An interface unit 1226 enables the communication system o share information and control with the sensor fusion 1206, processor 1202, and sensor modules 1230. This may result in changes in characteristics and parameters of the beam form to utilize multipath transmissions and enhance communication with a base station. FIG. 13 is a method for improving communication in a system as in FIG. 12. While wireless communication is in progress, 1302, the radar module checks for line of sight (LOS) objects that are situated and interfering with communications to the base station, 1304. An LOS object may be a building, a wall or other structure that may interfere with, or impair, the transmission path between a vehicle and the base station radio. The radar module considers a current position of the vehicle and also a future position along the vehicle path to anticipate the conditions of the communication transmission channel. The directional antenna beams used for high speed communications, such as the mobile broadband standards promulgated by 3GPP (Third Generation Partnership Project) and referred to as 5G, supporting wireless communications among users and machines directs each transmission from the base station to user.

In 5G terminology, the system is referred to as NextGen System (NGS), the base station (BS) is referred to as a NextGen BS (gNB or gNode B) supporting 5G New Radio (5G NR) and the user equipment (UE) is referred to as NextGen User Equipment (NG UE) supporting the 5G NR. The 5G transmissions are directed beams rather than the omnidirectional beams used in 4G. The directed beam of a 5G system supports high data rates to the user, however the gain of the antenna is focused in a single direction rather than in many directions and so the transmissions are susceptible to a range of obstacles. In addition the beams are at higher frequencies having short gain drop off, requiring repeaters to increase the range of the communications. The radar module 1240 of system 1200 operates in SRR and LRR modes, or multiple range modes, providing information on objects that may not only interfere with the vehicle motion but also with communication signals. This information is provided to the sensor fusion 1206 or may be provided to the communication system 1220 directly or by another route in system 1200. The information received from radar module 1240 may initiate operation of the transmission enhancement unit 1222. Similarly, information from other sensor modules may also be used to adjust and control the communication system 1220.

FIG. 13 illustrates operation of system 1200 in process 1300 where wireless communication from a vehicle are in progress 1302. The vehicle has a reconfigurable radar module as described herein that checks for LOS object in the communication path, 1302. Specifically, this is from the vehicle to the base station or radio transmitter of the communication system. If an object is detected in the LOS that would interfere with the wireless communication, 1302, an instruction or information is sent to the wireless communication module to implement turbo operation, 1306. Processing returns to continue wait for information from radar processing, and any results that may indicate an issue with the communication path 1302. When an LOS is not detected, 1302, the process considers if the distance to the base station exceeds a threshold, 1304, and if so sends instruction or information to the wireless communication module to enable turbo operation to boost signal, 1306, and returns to wait for information from radar operation, 1302. Turbo operation may also incorporate a redirection of the signal to the base station so as to adjust the angular direction of the communication transmission beam. This enables avoidance of the obstacle and creates a non-line of sight (NLOS) transmission path for the communication system. Where infrastructure includes reflectors or redirection structures for wireless communication, the system may identify the reflector and direct communications for redirection.

Figure 14A:
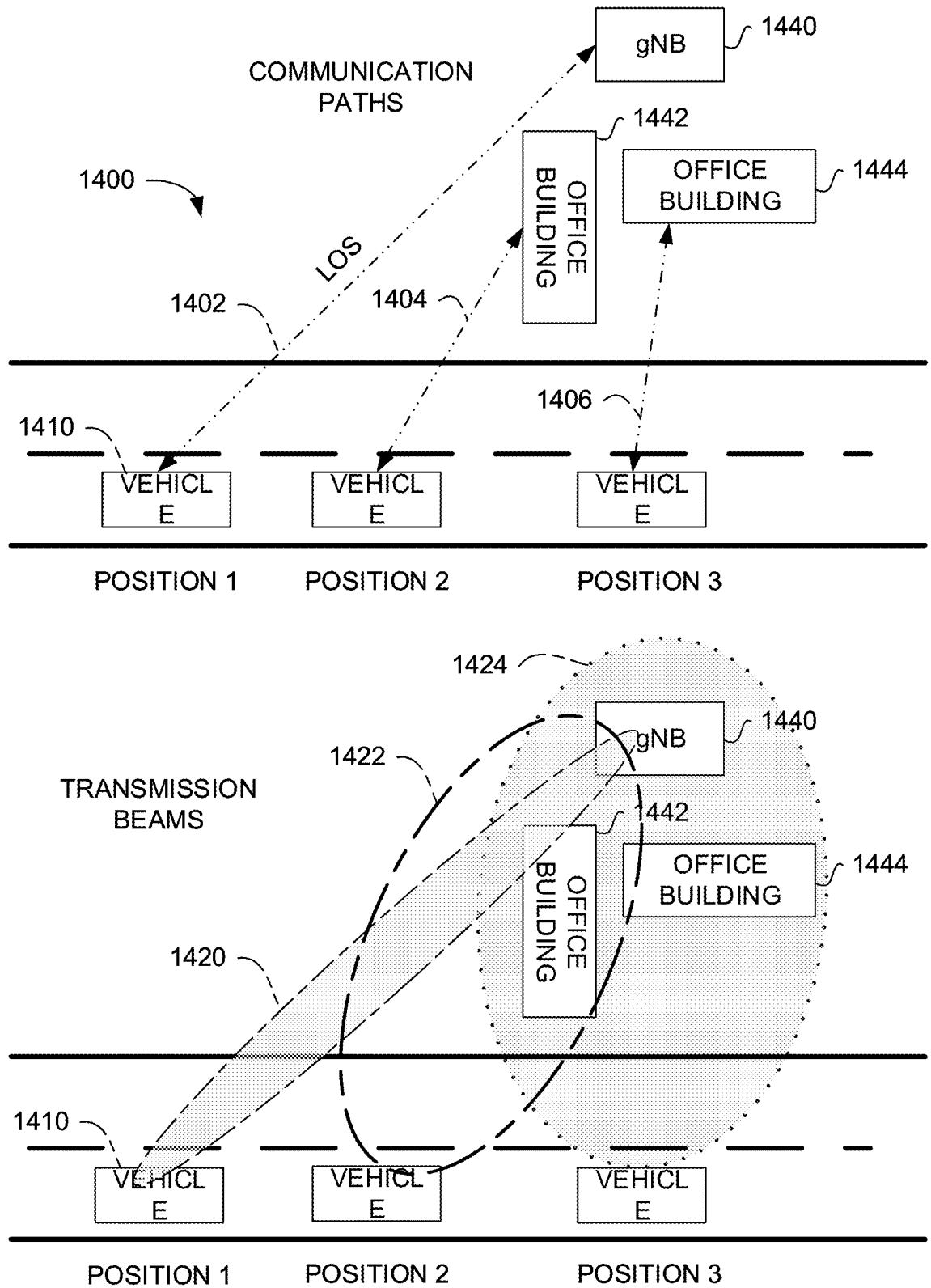
FIGS. 14A to 14C illustrate dynamic beamform adjustment in non-line of sight environments, according to embodiments of the present inventions.

A variety of scenarios and controls are available in the systems presented herein. FIG. 14A illustrates an example scenario for vehicle 1410 moving from position 1 to position 2 to position 3 and so forth. FIG. 14A has a communication paths drawing at the top of the page and a corresponding transmission beams drawing at the bottom. In the environment 1400 are office buildings 1442, 1444 and gNB 1440. The top image illustrates the communication path from each position to the gNB 1440. In position 1, the vehicle has a LOS to gNB 1440 and the transmission beam form is 1420, a narrow beam with high directivity. In position 2, the building 1442 is an object acting as an obstacle to in the communication path from vehicle 1410 to gNB 1440 making the area of the gNB 1440 a NLOS area. As illustrated, to maintain communication with the gNB 1440, the vehicle requires a broader beam form 1422. The vehicle may send a message or indication to the gNB 1440 identifying the NLOS conditions and instructing the gNB to form a beam to reach the vehicle in this position. Still moving, when the vehicle is in position 3, the communication path 1406 is obstructed by office building 1444 and again the gNB 1440 is in a NLOS area. At this point, the beam form is a broad beam.

Figure 14B:
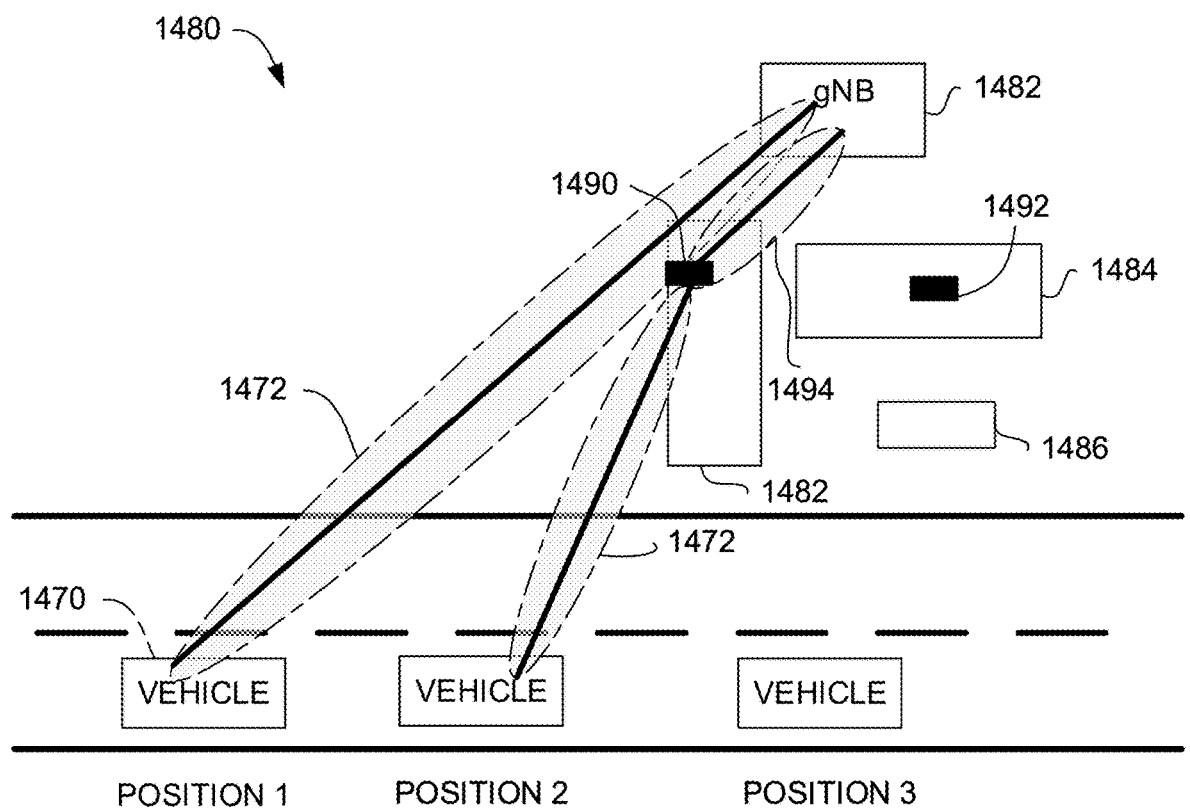

FIG. 14B illustrates the same configuration as in FIG. 14A where redirection device(s) 1490, 1492 are positioned within environment 1480. The gNB 1482 is a 5G communication transmitter or other high directivity transmitter in communication with vehicle 1470. In position 1 the communication beamform 1472 is a LOS path for communication. In position 2, the signal from gNB 1482 is directed to redirection device 1490 which changes the direction of the beam to result in beamform 1472 to vehicle 1470.

Figure 14C:
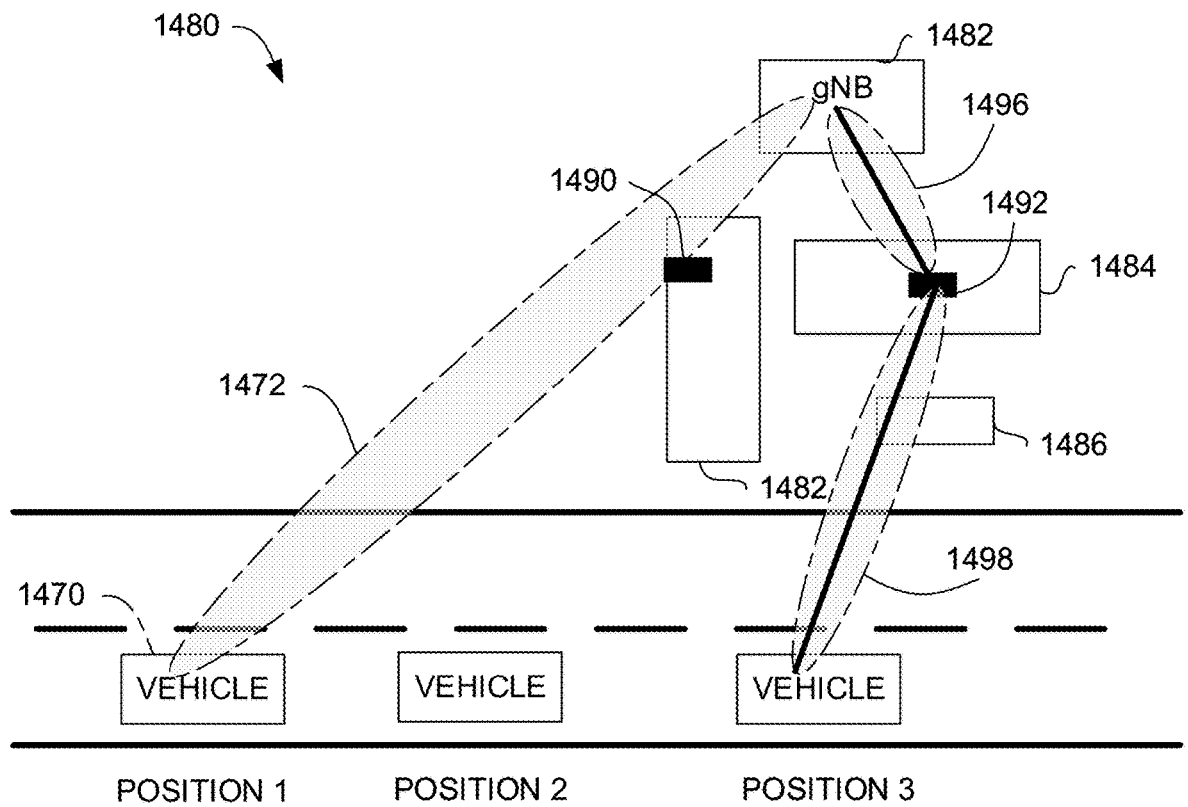

FIG. 14C illustrates communications within environment 1480 and vehicle 1470 at position 3. The gNB 1482 directs beams to reflection device 1492 which then directs the beam to vehicle 1470. The first beamform 1496 is in a first direction, and the redirection device 1492 changes the direction of the beam to that of beamform 1498. The redirection device may be a passive device such as the ECHO™ reflector of Metawave Corp., Carlsbad CA, which has a surface constructed to change the direction of an incident beamform. The redirection device 1490, 1492 may be a passive device or an active device. An active device, such as a TURBO™ repeater of Metawave Corp., Carlsbad CA, which may direct the beam dynamically and may boost the signal to increase the range and/or quality of the signal.

Figure 15:
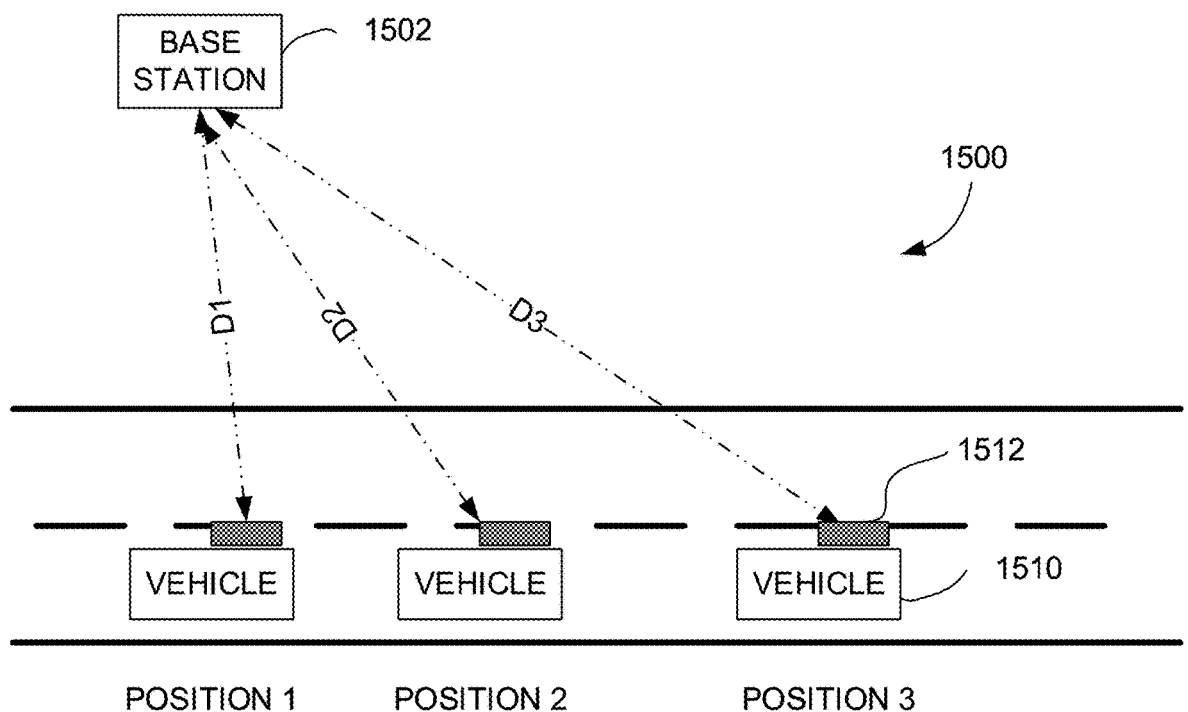
FIG. 15 illustrates dynamic beamform adjustment as a function of distance from a vehicle to a base station from sensor information, according to embodiments of the present inventions.
Figure 15:
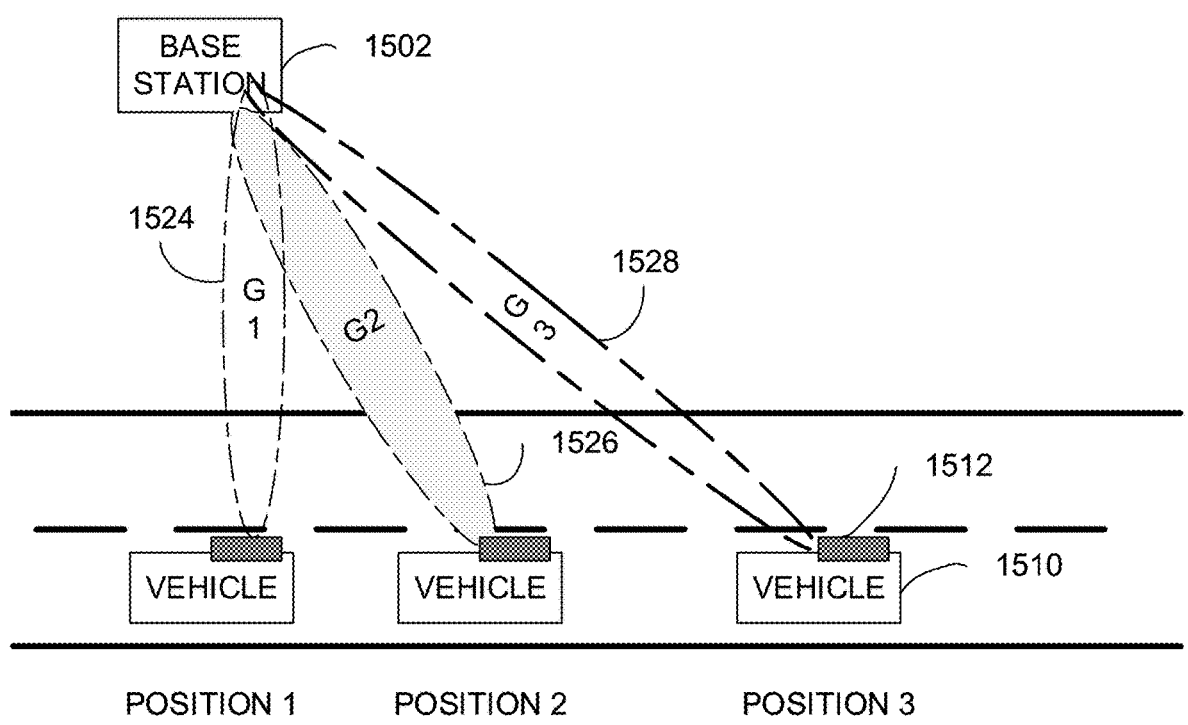

FIG. 15 illustrates a scenario 1500 where vehicle 1510 includes a repeater unit 1512 to increase the gain of communication signals from the vehicle. At position 1, the vehicle 1510 is at a distance D1 to the BS 1502, at position 2 a distance of D2 and at position 3 a distance D3. At each position the repeater 1512 changes the gain and/or beamform to achieve the proper gain. At position 1 the signal has a gain G1, position 2 a gain G2 and at position 3 G3. The Distance D1 has a corresponding beamform 1524. At distance D2, which is greater than D1, a beamform 1526 has a higher gain to ensure consistent connectivity. At distance D3, the repeater 1512 generates a narrow beam having high gain to reach the BS 1502. In these situations, the sensors of vehicle 1510 identify the location of the BS 1502 and determine the required signal strength and beamform for communications. This information is used by repeater 1512 to adjust the transmissions to BS 1502. The ability to dynamically change the parameters of the communication transmissions improves mobile communications from the vehicle 1510.

The present invention enables short and long-range radar configurations in a radar system. The SRR mode enables a wide beam with lower gain but is able to make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A vehicle system, comprising:
a wireless communication system adapted for high directivity cellular communications, comprising:
a communication module; and
a transmission enhancement module; and
a radar module comprising:
a transceiver;
an antenna module;

a reconfiguration unit coupled to the transceiver and the antenna module, the reconfiguration unit adapted to configure the radar module for multiple ranges of operation, the reconfiguration unit comprising:
an analog antenna controller for analog transmission of radio frequency signals from antenna elements in the antenna module; and
a digital controller to control a power divider network coupled to the antenna elements and distribute power across antenna elements in the antenna module,
wherein the radar module is configured for azimuth and elevation scanning to cover an expanded field of view.

2. A vehicle system as in claim 1, wherein on detection of an object between the vehicle system and a wireless communication transmitter by the radar module, the transmission enhancement module adjusts transmission parameters of the wireless communication.

3. A vehicle system as in claim 2, wherein the reconfiguration unit comprises a plurality of switching means to couple the transceiver to the antenna module to accomplish different ranges of operation.

4. A vehicle system as in claim 3, wherein the reconfiguration unit configures the antenna array for a first range of operation at a first time period with guard band slots and configures the second range of operation during the guard band slots.

5. A vehicle system as in claim 4, wherein the antenna array has subsets of antenna elements, and the reconfiguration unit configures the antenna array for use of each of the subsets of antenna elements during different range operations.

6. A vehicle system as in claim 5, further comprising a sensor fusion module coupled to a plurality of sensor modules, wherein on detection of an object in a line of sight between the vehicle system and a base station, the sensor fusion triggers control of the wireless communication system to change transmission parameters of communications.

7. The vehicle system as in claim 1 wherein the radar module is an RF front end system and wherein the antenna module comprises:
a plurality of antenna elements;
a configuration network coupled to the plurality of antenna elements;
an RF module coupled to configuration network;
wherein the configuration network is adapted for multiple range operation.

8. The vehicle system as in claim 7 wherein the configuration network comprises a reconfiguration means for controlling the configuration network.

9. The vehicle system as in claim 8, wherein the configuration network is a switch network comprising a plurality of switches to reconfigure the RF front end system for multi-range operation.

10. The vehicle system as in claim 9, wherein the plurality of 16/switches comprise multi-port switches to change connections within the configuration network and the reconfiguration means controls the state of the multi-port switches.

11. The vehicle system as in claim 10 wherein the RF module comprises:
a transmitter coupled to a first set of switches; and
a receiver coupled to a second set of switches.

12. The vehicle system as in claim 11 wherein at least one port of the first set of switches is coupled to at least one port of the second set of switches.

13. The vehicle system as in claim 12, wherein a first set of elements of the plurality of antenna elements are organized as a first array and the second set of elements of the plurality of antenna elements are organized as a second array.

14. The vehicle system as in claim 13, wherein the reconfiguration means configures the RF front end system to transmit from the first and second array at a first time and configures the RF front end system to receive from the first and second array at a second time.

15. The vehicle system as in claim 14, wherein the reconfiguration means controls operation of the first and second arrays for a first transmission range and a second transmission range by time division duplexing scheme.

16. The vehicle system as in claim 15, wherein the time duplexing scheme applies a guard band for the first transmission range, and wherein transmission for the second transmission range are transmitted during the guard band.

17. The vehicle system as in claim 16, wherein the antenna module is an antenna array comprising:
a receiver to receive radar signals;
a first antenna element array;
a transmitter to generate radar signals;
a second antenna element array;
at least one power divider and combiner network coupled to each of the first and second antenna element arrays; and
a reconfiguration module coupled to the at least one power divider and combiner network and adapted to reconfigure reception and transmission paths through the radar system.

18. The vehicle system as in claim 17, wherein the reconfiguration module is adapted to couple the first antenna element array and the second antenna element array to the transmitter.

19. The vehicle system as in claim 18, wherein the reconfiguration module is adapted to couple the first antenna element array and the second antenna element array to the receiver.

20. The vehicle system as in claim 19, wherein the reconfiguration module is adapted to couple the first antenna element array to the transmitter and the second antenna element array to the receiver.

* * * * *